US 9,373,854 B2

(12) United States Patent
Kawabata et al.

(10) Patent No.: US 9,373,854 B2
(45) Date of Patent: Jun. 21, 2016

(54) SOLID POLYMER FUEL CELL

(75) Inventors: Norihiko Kawabata, Osaka (JP);
Takashi Morimoto, Osaka (JP); Soichi Shibata, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 13/807,069

(22) PCT Filed: May 16, 2012

(86) PCT No.: PCT/JP2012/003187
§ 371 (c)(1),
(2), (4) Date: Dec. 27, 2012

(87) PCT Pub. No.: WO2012/157266
PCT Pub. Date: Nov. 22, 2012

(65) Prior Publication Data
US 2014/0134510 A1 May 15, 2014

(30) Foreign Application Priority Data
May 17, 2011 (JP) ................. 2011-110659

(51) Int. Cl.
*H01M 8/04* (2016.01)
*H01M 8/24* (2016.01)
(Continued)

(52) U.S. Cl.
CPC ........ *H01M 8/04029* (2013.01); *H01M 8/0267* (2013.01); *H01M 8/0273* (2013.01); *H01M 8/0276* (2013.01); *H01M 8/242* (2013.01); *H01M 8/2485* (2013.01); *H01M 8/04074* (2013.01); *H01M 2008/1095* (2013.01); *Y02E 60/50* (2013.01)

(58) Field of Classification Search
None
See application file for complete search history.

(56) References Cited

U.S. PATENT DOCUMENTS

| 4,910,100 A * | 3/1990 | Nakanishi et al. ............ 429/423 |
| 2008/0090130 A1 | 4/2008 | Ichikawa |
| 2008/0124597 A1 | 5/2008 | Murata et al. |

(Continued)

FOREIGN PATENT DOCUMENTS

| CN | 101107742 | 1/2008 |
| CN | 101512815 | 8/2009 |

(Continued)

OTHER PUBLICATIONS http://www.merriam-webster.com/dictionary/laminated.*

(Continued)

*Primary Examiner* — Patrick Ryan
*Assistant Examiner* — Christopher Domone
(74) *Attorney, Agent, or Firm* — Pearne & Gordon LLP

(57) ABSTRACT

In a solid polymer fuel cell, destabilization of a voltage when an output state is changed is suppressed, and flow of a corrosion current through a cooling liquid in a cooling liquid manifold is reduced. The fuel cell is constructed by laminating a plurality of fuel battery cells, each including an MEA, a pair of separators, a frame that surrounds the periphery of the MEA, an anode, and a cathode, and a cooling liquid manifold that is formed by the frame. A flow channel of the cooling liquid manifold has a constant flow channel cross-sectional area, and a flow channel length of the cooling liquid manifold, which is included in one of the fuel battery cells, along a flow channel direction is longer than the thickness of the one fuel battery cell in a stacked direction.

6 Claims, 19 Drawing Sheets

(51) Int. Cl.
*H01M 8/02* (2016.01)
*H01M 8/10* (2016.01)

(56) References Cited

U.S. PATENT DOCUMENTS

| | | | |
|---|---|---|---|
| 2008/0241607 A1* | 10/2008 | Owejan et al. | 429/13 |
| 2009/0017355 A1* | 1/2009 | Kawabata et al. | 429/30 |
| 2009/0081522 A1 | 3/2009 | Washima et al. | |
| 2010/0047650 A1 | 2/2010 | Iino et al. | |
| 2010/0178577 A1 | 7/2010 | Morita et al. | |
| 2010/0196774 A1* | 8/2010 | Kawabata et al. | 429/437 |
| 2013/0004877 A1 | 1/2013 | Takeguchi | |

FOREIGN PATENT DOCUMENTS

| | | |
|---|---|---|
| JP | 2002-134130 A | 5/2002 |
| JP | 2005-158629 A | 6/2005 |
| JP | 2006-172849 A | 6/2006 |
| JP | 2007-103061 A | 4/2007 |
| JP | 2007-134180 A | 5/2007 |
| JP | 2008-226710 A | 9/2008 |
| JP | 2009-152069 A | 7/2009 |
| JP | 2010-113864 A | 5/2010 |
| WO | 2007/061075 A1 | 5/2007 |
| WO | 2008/044481 A1 | 4/2008 |

OTHER PUBLICATIONS

Extended European Search for Application No. 12785194.7-1360/2573852 Dated Jul. 5, 2013.
International Search Report for PCT/JP2012/003187 dated Jul. 3, 2012.

* cited by examiner

SOLID POLYMER FUEL CELL

TECHNICAL FIELD

The present invention relates to a fuel cell, and more particularly, to a fuel cell using a solid polymer electrolyte that is used in a portable power supply, a power supply for an electric vehicle, an in-house cogeneration system, or the like.

BACKGROUND ART

A fuel cell using a solid polymer electrolyte in the related art is a device that allows a fuel gas containing hydrogen and an oxidant gas such as air containing oxygen to electrochemically react with each other and generates power and heat at the same time. The fuel cell includes a stacked body of a unit cell called a fuel battery cell. As shown in FIG. 1, a general fuel cell includes a stacked body 14 in which 10 to 200 fuel battery cells are stacked, and includes a pair of current collector plates 9 between which both ends of the stacked body 14 are interposed, insulation plates 10 between which the pair of current collector plates 9 are interposed, and a pipe-attached end plate 11. Examples of a pipe of the pipe-attached end plate 11 include a pipe that supplies a reaction gas, a pipe that supplies a cooling liquid, and the like. In addition, a fuel cell stack is fastened with a bolt 12 and a nut 13.

The fuel battery cell of the fuel cell using the solid polymer electrolyte includes a polymer electrolyte membrane that selectively conveys hydrogen ions, and a pair of electrodes between which the polymer electrolyte membrane is interposed. Each of the electrodes includes a catalyst layer that contains a carbon powder that supports a platinum group metallic catalyst as a main component, a gas diffusion layer that is formed outside the catalyst layer and has both gas permeability and electronic conductivity.

A gas sealing material or a gasket, which prevents the fuel gas and the oxidant gas that are supplied from leaking to the outside or prevents the fuel gas and the oxidant gas from being mixed with each other, is disposed on the periphery of the electrodes of the fuel battery cell with the polymer electrolyte interposed therebetween. The sealing material or gasket, the electrodes, and the polymer electrode membrane may be integrated and assembled in advance. This assembly is called an MEA (electrolyte membrane electrode assembly).

A fuel battery cell includes conductive separators that are disposed at both surfaces of the MEA. The conductive separator mechanically fixes the MEA and electrically connects adjacent MEAs in series. A flow channel, which supplies a reaction gas (a fuel gas or an oxidant gas) to an electrode surface and carries away generated water or excess gas, is formed at a portion at which the separator and the MEA come into contact with each other. Generally, this flow channel is constructed by a groove formed at a contact surface of the separator and the MEA, but may be provided as a member that is separate from the separator.

The fuel cell generates heat during operation, and thus it is necessary for the fuel cell to be cooled down with a cooling liquid so as to approximately maintain a temperature state of the fuel battery cell. Accordingly, at least a part of fuel battery cells of the fuel cell is provided with a cooling portion through which the cooling liquid flows. The cooling portion may be provided to all of the fuel battery cells, but may be provided every one to three fuel battery cells. The cooling portion may be constructed by a cooling liquid flow channel member that is interposed between the fuel battery cells. However, in many cases, the cooling portion is a cooling liquid flow channel that is provided to the separator of the fuel battery cell on a surface opposite to the contact surface with the MEA.

FIG. 2A shows a stacked cross-section in the vicinity of a cooling liquid manifold 5 of a general fuel cell in the related art, and FIG. 2B shows a perspective diagram in the vicinity of the cooling liquid manifold 5. In FIGS. 2A and 2B, a fuel battery cell 6, which includes a frame 1 that is integrated with MEA 1-a, an anode separator 2, and a cathode separator 3, is shown. A fuel gas flow channel 2a through which a fuel gas flows is provided to the anode separator 2 in a surface that comes into contact with the MEA 1-a, and an oxidant gas flow channel 3a through which an oxidant gas flows is provided to the cathode separator 3 in a surface that comes into contact with the MEA 1-a. Furthermore, a cooling liquid flow channel 7 is provided to the cathode separator 3 in a surface opposite to the surface that comes into contact with the MEA 1-a.

Furthermore, a cooling liquid flows through the cooling liquid manifold 5 that penetrates through the frame 1, the anode separator 2, and the cathode separator 3. The cooling liquid flows along a lamination direction (an arrow X-X) of the fuel battery cells. In addition, a flow channel cross-sectional area (an area of a cross-section orthogonal to a flow direction of the cooling liquid) of the cooling liquid manifold 5 is expressed by a diagonal line region a and the area thereof is constant.

As described above, the fuel cell includes a stacked body of fuel battery cells. However, in the fuel battery cells that are connected to each other in series, it is necessary for contact resistance between adjacent fuel battery cells to be suppressed as low as possible so as to suppress ohmic loss during power generation.

On the other hand, it is necessary to reliably form insulation between an anode and a cathode constituting each of the fuel battery cells. In addition, it is necessary to make the resistance between battery cells that are not adjacent to each other, rather than battery cells that are adjacent to each other, as large as possible and to maintain the insulation state. In a case where members which should be insulated from each other are short-circuited by a material such as a metal having high electronic conductivity, since a current corresponding to a resistance flows, power that should be supplied to the outside of the fuel cell is consumed inside the fuel cell, and thus the power generation efficiency decreases.

In addition, members which should be insulated from each other may be short-circuited due to an ion conductor such as tap water. When the short-circuit due to the ion conductor occurs, an oxidation reaction occurs at an interface between a high-voltage side battery cell and the ion conductor while a current flows to the ion conductor. As a result, corrosion degradation of a constituent member of the fuel battery cell occurs. Finally, this may lead to a leakage of the fuel gas or the cooling liquid to the outside of the fuel cell.

As shown in FIGS. 2A and 2B, in a fuel cell having a general construction, the cooling liquid that flows through the cooling liquid manifold 5 comes into contact with a plurality of fuel battery cells. Accordingly, so as to suppress a decrease in the above-described power generation efficiency or corrosion deterioration, it is necessary to maintain the insulation state by using pure water as the cooling liquid.

However, during power generation of the fuel cell, an ion component, which elutes from a pipe member that comes into contact with the cooling liquid or a material such as a metal and a resin that is used in the fuel cell, or carbon dioxide gas, a $NO_x$ gas, an $SO_x$ gas, or the like in the air is dissolved in the cooling liquid. Accordingly, even when the cooling liquid is formed from pure water, conductivity of the cooling liquid gradually increases. So as to maintain the conductivity of the cooling liquid to be low, the purity of the cooling liquid may be raised, the cooling liquid may be purified by an ion exchange resin, or pure water may be additionally added to the cooling liquid so as to dilute the cooling liquid. However, when carrying this out, an increase in the scale of a system due to an increase in incidental equipment or cost increases in direct material costs, maintenance costs, or the like become problematic.

Therefore, a technology in which a current (corrosion current) flowing through the cooling liquid inside the cooling liquid manifold is suppressed by partially narrowing a flow channel cross-sectional area of the cooling liquid manifold without making the flow channel cross-sectional area constant is suggested (refer to Patent Document 1).

In addition, devising of a shape of the flow channel of the manifold into various kinds of shapes is suggested. For example, a technology in which a protrusion or a bridge part is provided inside the gas manifold to adjust the gas flow is suggested (Patent Documents 2 and 3). In addition, a technology in which a plate that blocks the gas flow is provided in the vicinity of a supply port inside the gas manifold or the cooling liquid manifold to make the gas flow or the cooling liquid flow have a spiral shape is suggested (Patent Documents 4 and 5). In addition, a technology in which the flow channel is made to have a spiral pin shape so as to promote discharge of a liquid that is generated in an off-gas manifold is suggested (Patent Document 6). In addition, a technology in which a flow channel of the cooling liquid manifold attached to the outside of a stacked body is made to have a spiral shape is suggested (Patent Document 7). In addition, a technology in which an inner portion is provided on an inner circumferential surface of a core (manifold) formed from a metal to suppress corrosion of a metal making up the core is suggested (Patent Document 8).

In addition, a fuel cell separator, which includes a conductive flow channel portion and an insulating periphery surrounding the conductive flow channel portion, and in which a manifold is provided to the insulating periphery is suggested (Patent Document 9).

CITATION LIST

Patent Literature

PTL 1: Japanese Patent Application Laid-Open No. 2010-113864
PTL 2: International Publication No. 2007/061075
PTL 3: US Patent Application Laid-Open No. 2009/0017355
PTL 4: Japanese Patent Application Laid-Open No. 2006-172849
PTL 5: US Patent Application Laid-Open No. 2008/0090130
PTL 6: Japanese Patent Application Laid-Open No. 2009-152069
PTL 7: Japanese Patent Application Laid-Open No. 2002-134130
PTL 8: US Patent Application Laid-Open No. 2009/0081522
PTL 9: US Patent Application Laid-Open No. 2010/0047650

SUMMARY OF INVENTION

Technical Problem

As described above, Patent Document 1 suggests that a flow channel cross-sectional area of the cooling liquid manifold is partially narrowed. A summary of this suggestion will be described with FIGS. 3A and 3B as a reference example of the invention.

FIG. 3A shows a diagram illustrating a stacked cross-section in the vicinity of a cooling liquid manifold 5 of a fuel cell, FIG. 3B shows a perspective diagram in the vicinity of the cooling liquid manifold 5. In FIGS. 3A and 3B, a fuel battery cell 6, which includes a frame 1 that is integrated with MEA 1-*a*, an anode separator 2, and a cathode separator 3, is shown. A fuel gas flow channel 2-*a* through which a fuel gas flows is provided to the anode separator 2 in a surface that comes into contact with the MEA 1-*a*, and a oxidant gas flow channel 3-*a* through which an oxidant gas flows is provided to the cathode separator 3 in a surface that comes into contact with the MEA 1-*a*.

A protrusion 3-*b* of the cathode separator 3 protrudes to the inside of the cooling liquid manifold 5 shown in FIGS. 3A and 3B. The protrusion 3-*b* partially narrows a flow channel cross-sectional area of the cooling liquid manifold 5. In FIG. 3B, a flow channel cross-section (without being narrowed) of the usual cooling liquid manifold 5 is expressed by a diagonal line portion α, and a flow channel cross-section that is partially narrowed is expressed by a diagonal line portion β. In this manner, when the flow channel cross-sectional area of the cooling liquid manifold 5 is partially narrowed, a current that flows through a cooling liquid within the cooling liquid manifold 5 is suppressed and thus a corrosion current is prevented.

However, in recent developments in fuel cells, in addition to blocking of the corrosion current that flows through the cooling liquid of the cooling liquid manifold, improvements in resistance against a load variation is also required. That is, in the fuel cell, even when the output is frequently changed, it is necessary to reliably maintain a stable power generation performance, a heat collection performance, and durability.

Regarding the output change of the fuel cell, in a case where the output state of the fuel cell is changed from a high-output state to a low-output state, firstly, it is necessary to decrease the inverter current, and then it is necessary to decrease the supply of the reaction gas and the cooling liquid. This is to prevent polarity inversion due to supply deficiency of the reaction gas (the fuel gas and the oxidant gas).

Accordingly, when the fuel cell state is changed from the high-output state to the low-output state, a larger amount of cooling liquid than the amount necessary for power generation is supplied to the cooling liquid manifold, and some is temporarily remained in the cooling liquid manifold. It is necessary for the cooling liquid supplied to the cooling liquid manifold to flow into the cooling liquid flow channel of the separator after being warmed by thermal conduction. However, when the amount of the cooling liquid supplied to the cooling liquid manifold is larger than that is necessary for power generation, the cooling liquid is supplied to the cooling liquid flow channel of the separator before being warmed sufficiently.

FIG. 4 illustrates the cooling liquid manifold 5 of which flow channel cross-sectional area varies, and cooling liquid flow channels 7 of separators that are stacked along a flow channel direction of the cooling liquid manifold 5. Each of the separators is provided with a cooling liquid flow channel that communicates with the cooling liquid manifold 5. In addition, FIG. 4 illustrates a simulation result of the cooling liquid that flows through the cooling liquid manifold 5 immediately after the output state of the fuel cell is changed from the high-output state to the low-output state. A pattern inside the cooling liquid manifold 5 shown in FIG. 4 represents a cooling liquid flow. As shown in FIG. 4, it can be seen that when the high-output state is changed to the low-output state, a low-temperature cooling liquid that is additionally supplied to the cooling liquid manifold 5 directly flows into the cooling liquid flow channel of the separator. That is, it can be seen that before being warmed at the inside of the cooling liquid manifold 5, the cooling liquid flows into the cooling liquid flow channel of the separator. In this manner, the direct inflow of the low-temperature cooling liquid, which is additionally supplied to the manifold, to the cooling liquid flow channel of the separator is referred to as "drift".

In this manner, in a case where the cross-sectional area of the cooling liquid manifold is partially narrowed, when the high-output state is changed to the low-output state, the cooling liquid may be apt to remain at a portion at which the cross-sectional area of the cooling liquid manifold is enlarged. In addition, the remaining cooling liquid is apt to flow into the cooling liquid flow channel of the separator before being warmed at the inside of the manifold (drift occurs). When the drift occurs, a temperature of the separator in the vicinity of an inlet portion of the cooling liquid flow channel decreases. When the temperature of the separator decreases, the temperature of the reaction gas (the fuel gas and the oxidant gas) decreases, and thus dew condensation occurs in the reaction gas flow channel. In the low-output state, since a flow rate of the reaction gas is small, it is difficult to blow out condensed water that is generated in the reaction gas flow channel.

As described above, when the high-output state is changed to the low-output state, the reaction gas flow channel is apt to be clogged due to condensation, and thus the voltage is apt to be unstable. Furthermore, a voltage drop caused by partial gas deficiency may be a cause of promoting catalytic deterioration. Accordingly, an object of the invention is to suppress destabilization of a voltage when an output state is changed in a solid polymer fuel cell, and to decrease flow of a corrosion current through a cooling liquid inside a cooling liquid manifold.

Solution to Problem

That is, the invention relates to a fuel cell to be described below.

[1] A solid polymer fuel cell that is formed by laminating a plurality of fuel battery cells,
wherein each of the fuel battery cells includes,
a polymer electrolyte membrane,
an anode and a cathode between which the polymer electrolyte membrane is interposed,
an anode separator that comes into contact with the anode,
a cathode separator that comes into contact with the cathode,
an insulating frame that surrounds the periphery of the polymer electrolyte membrane, the anode, and the cathode, and
a cooling liquid manifold that is formed in the insulating frame and communicates with a cooling liquid flow channel,
at least one of the plurality of fuel battery cells includes the cooling liquid flow channel that is provided to the anode separator in a surface that is opposite to a surface that comes into contact with the anode, or to the cathode separator in a surface that is opposite to a surface that comes into contact with the cathode,
a flow channel of the cooling liquid manifold has a constant flow channel cross-sectional area, and
a flow channel length L of the cooling liquid manifold, which is included in one of the fuel battery cells, along a flow channel direction is longer than the thickness 1 of the one fuel battery cell in a lamination direction.

[2] The solid polymer fuel cell according to [1],
wherein the flow channel of the cooling liquid manifold includes a folded-back flow channel portion.

[3] The solid polymer fuel cell according to [1],
wherein the cooling liquid flow channel and the cooling liquid manifold communicate with each other through cooling liquid communication portions formed in the insulating frame and the separator, and
a flow channel length of the cooling liquid communication portion formed in the insulating frame is longer than a flow channel length of the cooling liquid communication portion formed in the separator.

[4] The solid polymer fuel cell according to [1],
wherein the insulating frame includes,
an MEA frame that integrates the polymer electrode membrane and the anode and the cathode between which the polymer electrode membrane is interposed, and
a sealing frame for sealing the cooling liquid flow channel that forms at least a part of the cooling liquid communication portion that connects the cooling liquid flow channel and the cooling liquid manifold.

Advantageous Effects of Invention

In the fuel cell of the invention, since the flow channel cross-sectional area of the cooling liquid manifold is constant, even when the output state is changed, it is difficult for drift to occur inside the cooling liquid manifold and also it is easy for the voltage to become stable. Furthermore, in the fuel cell of the invention, since the flow channel length of the cooling liquid manifold is long, flow of a current (corrosion current) through a cooling liquid inside the cooling liquid manifold is suppressed, and thus corrosion deterioration of a constituent material of fuel battery cells may be prevented.

DESCRIPTION OF EMBODIMENTS

Figure 1:
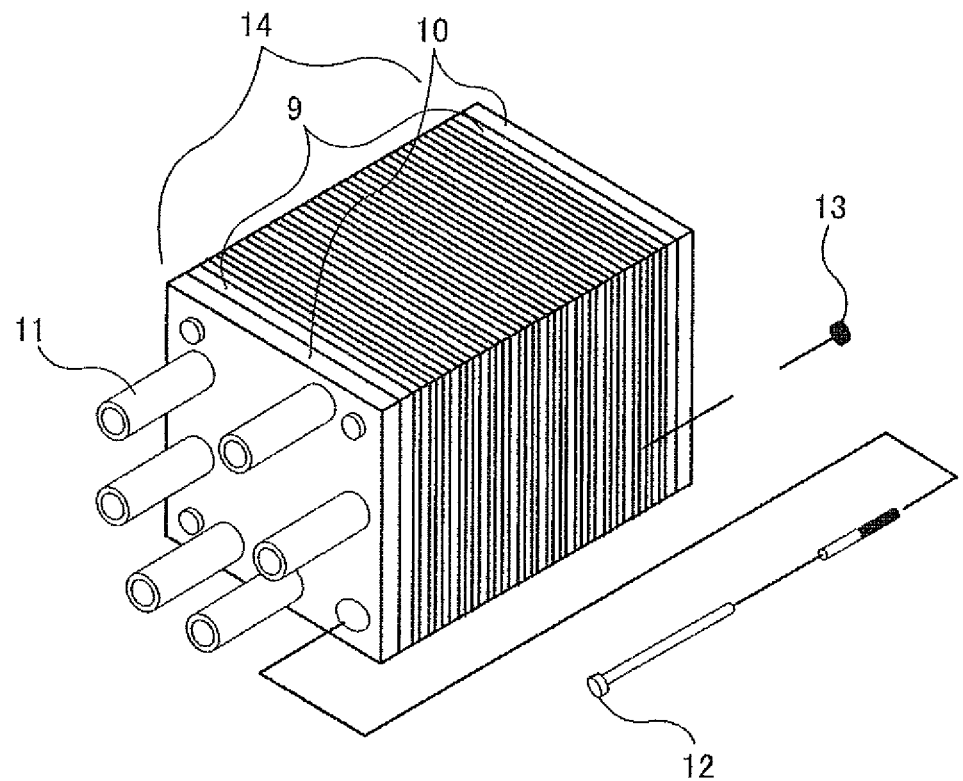
FIG. 1 is a perspective diagram illustrating a configuration of a fuel cell.

A fuel cell of the invention includes a stacked body in which a plurality of fuel battery cells are stacked. Each of the fuel battery cells includes at least a polymer electrolyte membrane, an anode and a cathode between which the polymer electrode membrane is interposed, an anode separator, a cathode separator, and an insulating frame.

A polymer electrolyte membrane is a polymer membrane that has a function of selectively conveying protons in a wet state. A polymer electrolyte is not particularly limited as long as the polymer electrolyte selectively moves hydrogen ions. Examples of the polymer electrolyte membrane include a fluorine-based polymer electrolyte membrane, a hydrocarbon-based polymer electrolyte membrane, and the like. Specific examples of the fluorine-based polymer electrolyte membrane include Nafion (registered trademark) manufactured by DuPont Corporation, Flemion (registered trademark) manufactured by ASAHI GLASS CO., LTD., Aciplex (registered trademark) manufactured by Asahi-Kasei Corporation, GORE-SELECT (registered trademark) manufactured by Japan Gore-Tex Corporation, and the like.

It is preferable that the anode and the cathode include a catalytic layer that comes into contact with the polymer electrolyte membrane and a gas diffusion layer that is laminated on the catalytic layer, respectively. The aspects thereof are not particularly limited. The polymer electrolyte membrane, the anode and the cathode between which the polymer electrolyte membrane is interposed are collectively called an MEA (Membrane Electrode Assembly).

The anode separator and the cathode separator are conductive plates that separate a fuel gas and an oxidant gas from each other. The material of each of the separators is not particularly limited as long as the material is conductive, and may be a metal or a carbon material.

The separator may include a central portion that comes into contact with the MEA and a peripheral portion surrounding the central portion. A concave portion and a convex portion are formed in the central portion of the separator that comes into contact with the MEA, and the concave portion may become a reaction gas flow channel (a fuel gas flow channel or an oxidant gas flow channel).

The peripheral portion of the separator may include a manifold for supplying and exhausting the fuel gas, and a manifold for supplying and exhausting the oxidant gas. Furthermore, the separator may include a rubber sealing portion that prevents a coolant, the oxidant gas, the fuel gas, or the like from being leaked.

On the other hand, in some fuel battery cells among a plurality of fuel battery cells that are stacked, a concave portion and a convex portion may be formed in the separator in a surface that is opposite to a surface that comes into contact with the MEA, and this concave portion may function as a cooling liquid flow channel. The separator in which the cooling liquid flow channel is formed may be either the anode separator or the cathode separator.

The insulating frame is an insulating member that surrounds the periphery of the MEA. The insulating frame reliably insulates the anode separator and the cathode separator between which the MEA is interposed. In this frame, the manifold for supplying and exhausting the fuel gas and the manifold for supplying and exhausting the oxidant gas are formed.

Figure 5A:
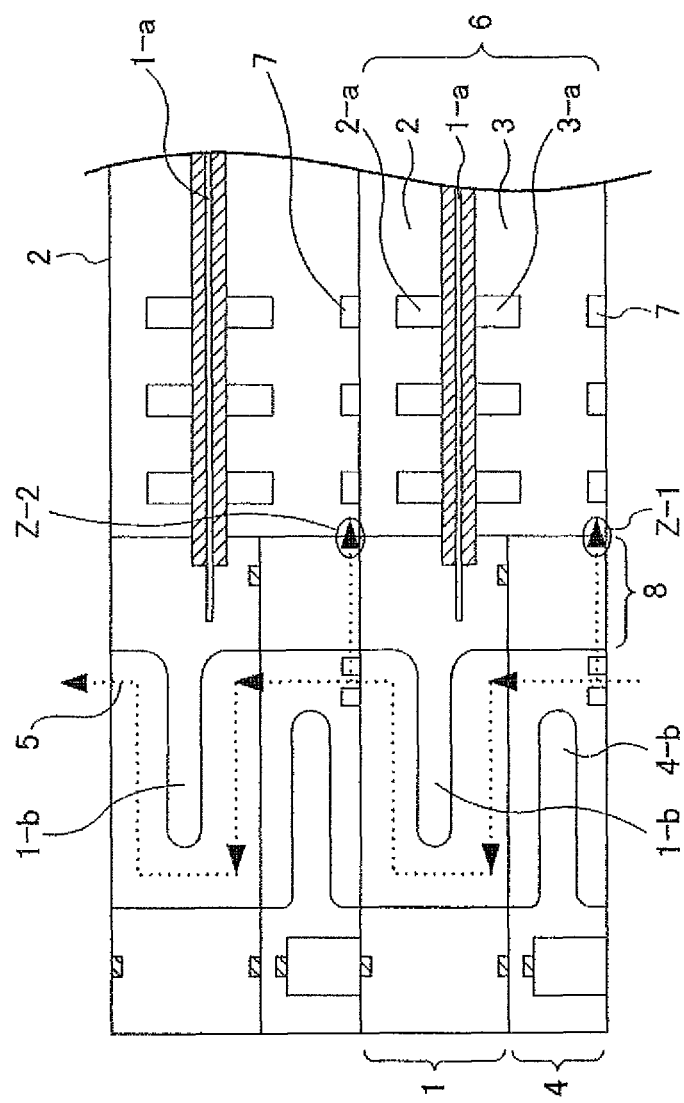
FIG. 5A is a diagram illustrating the vicinity of a cooling liquid manifold in a fuel cell of Embodiment 1.

The insulating frame may include an MEA frame that integrates the polymer electrolyte membrane, and the anode and the cathode between which the polymer electrolyte membrane is interposed, and a sealing frame for sealing the cooling liquid flow channel that forms at least a part of a cooling liquid communication portion that connects the cooling liquid flow channel and the cooling liquid manifold to each other (refer to FIG. 5A or the like).

Furthermore, the fuel cell of the invention includes a cooling liquid supply manifold for supplying a cooling liquid, and a cooling liquid discharge manifold for discharging the cooling liquid. In addition, one characteristic of the invention is present in a structure of the cooling liquid supply manifold or the cooling liquid discharge manifold.

First, the cooling liquid supply manifold and the cooling liquid discharge manifold may be constructed by a hole formed in the insulating frame, or a hole formed in the insulating frame and a hole formed in the separator, but are preferably constructed by a hole formed in the insulating frame. The reason why the member with which the cooling liquid comes into contact should be a member formed from an insulating material in order to suppress corrosion deterioration of the member as much as possible.

The flow channel through which the cooling liquid flows is constructed by the cooling liquid supply manifold and the cooling liquid discharge manifold, but it is preferable that the flow cross-sectional area be constant. The flow channel cross-sectional area represents the area of a cross-section, which is orthogonal to the direction in which the cooling liquid flows, of the manifold. It is preferable that the flow channel cross-sectional area of the cooling liquid supply manifold or the cooling liquid discharge manifold be within a range of 0.5 to 5.0 $cm^2$. "The flow channel cross-sectional area is constant" includes strictly constant, but it is preferable that the ratio "Smin/Smax" of the minimum cross-sectional area 5 min to the maximum cross-sectional area Smax of the flow channel that is constructed by the manifold be within a range of 0.9 to 1, and more preferably within a range of 0.95 to 1.

When the flow channel cross-sectional area is set to be constant, the flow of the cooling liquid in the manifold has a tendency to be uniform, and particularly, even when the output state of the fuel cell is changed, the drift of the cooling liquid in the manifold may be effectively suppressed. As described above, the drift of the cooling liquid in the manifold has a tendency to occur when the output state of the fuel cell is changed from the high-output state to the low-output state, and according to the invention, the drift may be suppressed.

It is preferable that the flow channel constructed by the cooling liquid supply manifold or the cooling liquid discharge manifold have a folded-back portion. When the folded-back portion is provided, the length of the flow channel constructed by the manifold may be lengthened. For example, the length of the flow channel of the manifold that is provided in one fuel battery cell is set to "L", and a thickness of the one fuel battery cell in the lamination direction is set to "1", "L>1" is satisfactory, and the ratio "L/1" of both is preferably 2.0 or more.

When the length of the flow channel constructed by the cooling liquid manifold becomes longer, flow of a current (a corrosion current) through the cooling liquid may be suppressed. The resistance value R of the cooling liquid present in the cooling liquid manifold is reversely proportional to the flow channel cross-sectional area of the manifold and is proportional to the flow channel length of the manifold. In the invention, the flow channel cross-sectional area of the cooling liquid manifold is constant. Accordingly, the longer the flow channel length is, the higher the resistance value of the cooling liquid that is present in the cooling liquid manifold. As a result, the flow of the current (the corrosion current) through the cooling liquid is suppressed.

The flow channel may be provided with the folded-back portion so as to make the length of the flow channel constructed by the cooling liquid manifold longer. The flow channel provided with the folded-back portion is not particularly limited. However, 1) the flow channel may be a flow channel in which a turn is repeated (a zigzag-shaped flow channel) (refer to FIGS. 5A and 5B, and FIGS. 9A and 9B), or 2) the flow channel may be spiral flow channel (refer to FIGS. 7A to 7C). In a case of the spiral flow channel, the drift that can occur in the flowing cooling liquid may be further effectively suppressed (refer to FIG. 11).

In addition, the cooling liquid manifold and the cooling liquid flow channel that is formed in the conductive separator communicate with each other through a cooling liquid communication portion. The cooling liquid communication portion may be constructed by a groove formed in the insulating frame and a groove formed in the conductive separator (refer to FIG. 6A). As described above, it is preferable that the member that comes into contact with the cooling liquid be a member formed from an insulating material. Therefore, it is preferable that a flow channel length L1 of the cooling liquid communication portion that is formed in the insulating frame be longer than a flow channel length L2 of the cooling liquid communication portion that is formed in the conductive separator.

Hereinafter, embodiments of the invention will be described with reference the attached drawings.

Embodiment 1

Figure 5B:
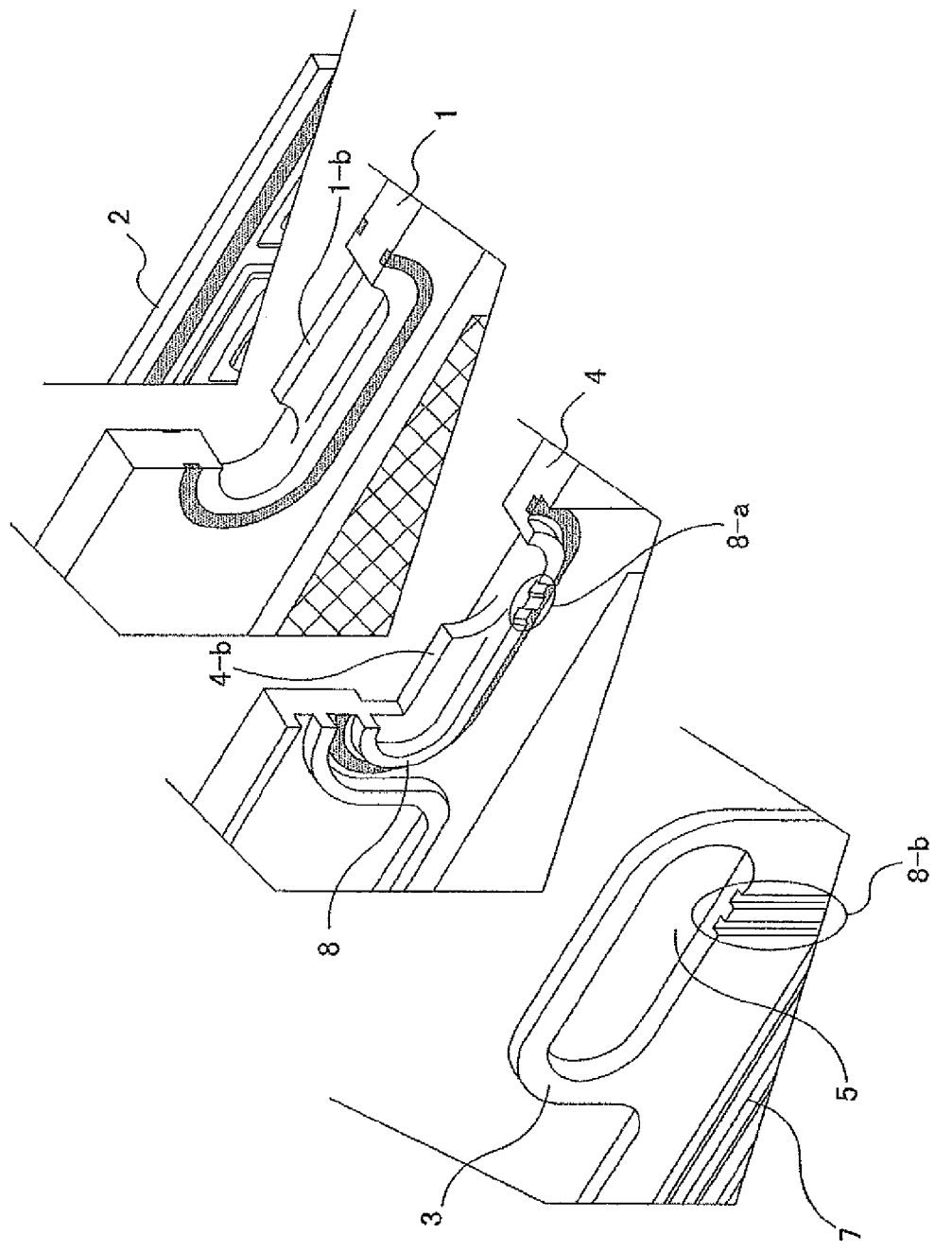
FIG. 5B is a diagram illustrating the vicinity of the cooling liquid manifold in the fuel cell of Embodiment 1.

FIGS. 5A and 5B illustrate a lamination state in the vicinity of a cooling liquid manifold in a fuel cell of Embodiment 1. FIG. 5A shows a cross-section of a stacked portion, and FIG. 5B shows a perspective diagram in the vicinity of the cooling liquid manifold. In FIG. 5B, approximately ¼ of the cooling liquid manifold is shown with a cross-section. The fuel cell of Embodiment 1 includes fuel battery cells 6 that are stacked to each other. Each of the fuel battery cells 6 includes an MEA frame 1 that is integrated with an MEA 1-a, an anode separator 2 and a cathode separator 3 between which the MEA 1-a is interposed, and a sealing frame 4 for sealing the cooling liquid flow channel that comes into contact with the MEA frame 1.

A cooling liquid flow channel 7 is formed in the cathode separator 3 in a surface that is opposite to a contact surface with the MEA 1-a. In FIGS. 5A and 5B, the cooling liquid flow channel 7 is formed in the cathode separator 3, but the cooling liquid flow channel may be formed in the anode separator 2.

The cooling liquid manifold 5 includes the MEA frame 1 and the sealing frame 4 for sealing the cooling liquid flow channel. In addition, a cooling liquid introduction channel 8, through which the cooling liquid manifold 5 and the cooling liquid flow channel 7 communicate with each other, is provided to the sealing frame 4 for sealing the cooling liquid flow channel. The cooling liquid introduction channel 8 includes a groove 8-a that is formed in the sealing frame 4 for sealing the cooling liquid flow channel, and a groove 8-b that is formed in the cathode separator 3. A part of the cooling liquid that flows through the cooling liquid manifold 5 passes through the cooling liquid introduction channel 8 and flows to the cooling liquid flow channel 7 of the cathode separator 3.

A protrusion 1-b that is provided to the MEA frame 1 and a protrusion 4-b that is provided to the sealing frame 4 for sealing the cooling liquid flow channel protrude at the inside of the cooling liquid manifold 5. The protrusion 1-b of the MEA frame 1 and the protrusion 4-b of the sealing frame 4 for sealing the cooling liquid flow channel protrude in directions that are opposite to each other. Accordingly, the cooling liquid that flows through the cooling liquid manifold 5 flows inside the cooling liquid manifold 5 in a zigzag manner as shown by the arrow in FIG. 5A.

As described above, since the cooling liquid flows inside the cooling liquid manifold 5 in a zigzag manner, the length of the flow channel constructed by the cooling liquid manifold 5 along the flow of the cooling liquid in the fuel battery cell 6 becomes longer than the thickness in a lamination direction of the fuel battery cell 6.

As a result, a distance between an entrance portion Z-1 of the cooling liquid flow channel 7 of the cathode separator 3 in an arbitrary fuel battery cell, and an entrance portion Z-2 of the cooling liquid flow channel of the cathode separator 3 in a fuel battery cell that is adjacent to the entrance portion Z-1 along the flow of the cooling liquid in the cooling liquid manifold 5 becomes longer, the entrance portions Z-1 and Z-2 coming into contact with the cooling liquid introduction channel 8. Accordingly, the insulation between cathode separators 3 of adjacent fuel battery cells becomes easy to maintain.

In this manner, the flow of the current through the cooling liquid in the cooling liquid manifold 5 may be suppressed, and thus the corrosion deterioration of a constituent material of the fuel battery cell 6 may be prevented.

Furthermore, the size of the protrusion 1-b and the protrusion 4-b is set in such a manner that the cross-sectional area of the cooling liquid manifold 5 in a direction that is orthogonal to the flow direction of the cooling liquid becomes constant. When the cross-sectional area of the cooling liquid manifold 5 in a direction that is orthogonal to the flow direction of the cooling liquid is set to be constant, even when the output state of the fuel cell is changed (for example, the output state is changed from a high-output state to a low-output state) and thus the amount of the cooling liquid that is supplied to the cooling liquid manifold 5 is changed, it is difficult for the drift to occur in the cooling liquid inside the cooling liquid manifold 5.

Embodiment 2

Figure 6A:
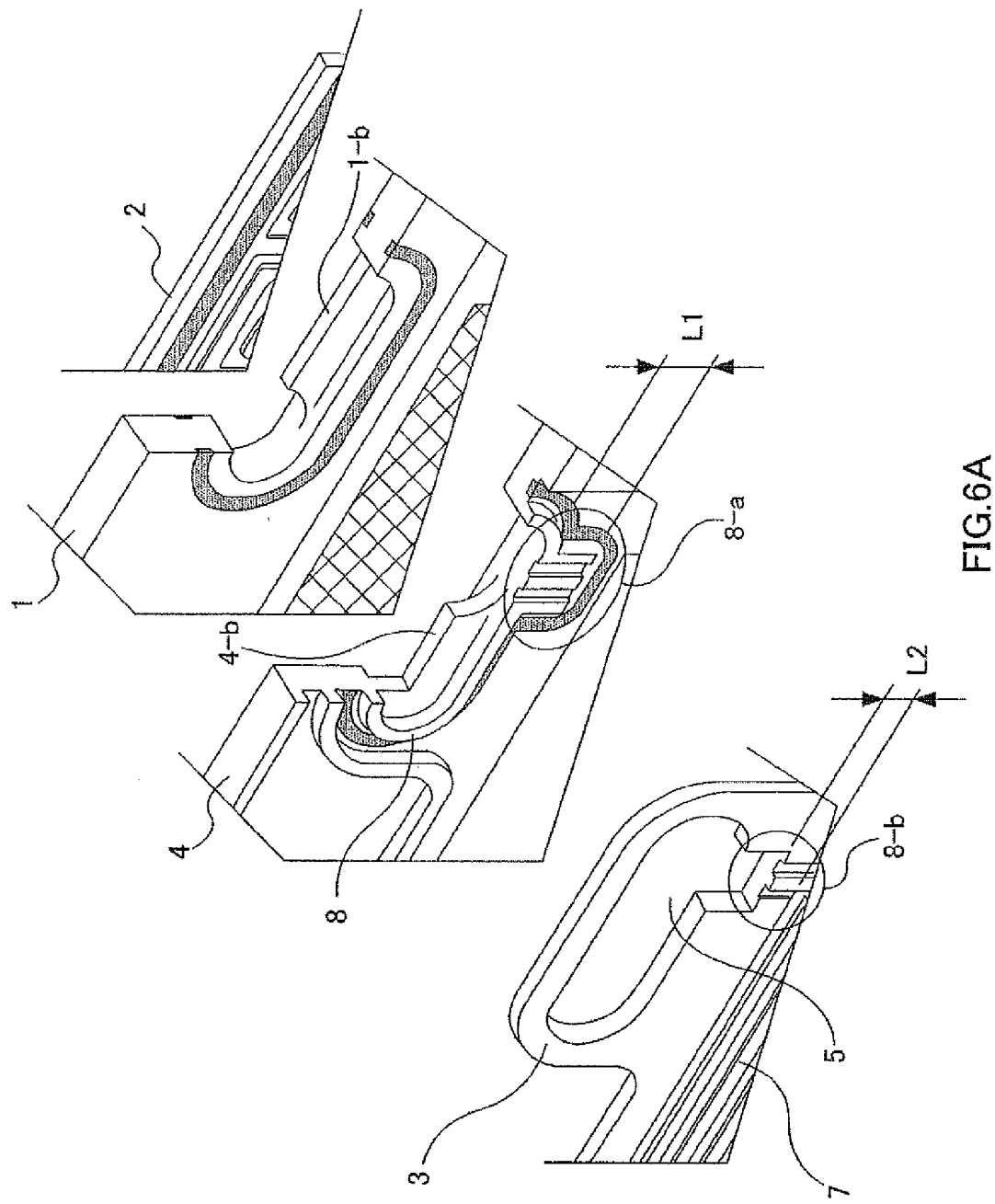
FIG. 6A is a diagram illustrating the vicinity of a cooling liquid manifold in a fuel cell in Embodiment 2.
Figure 6B:
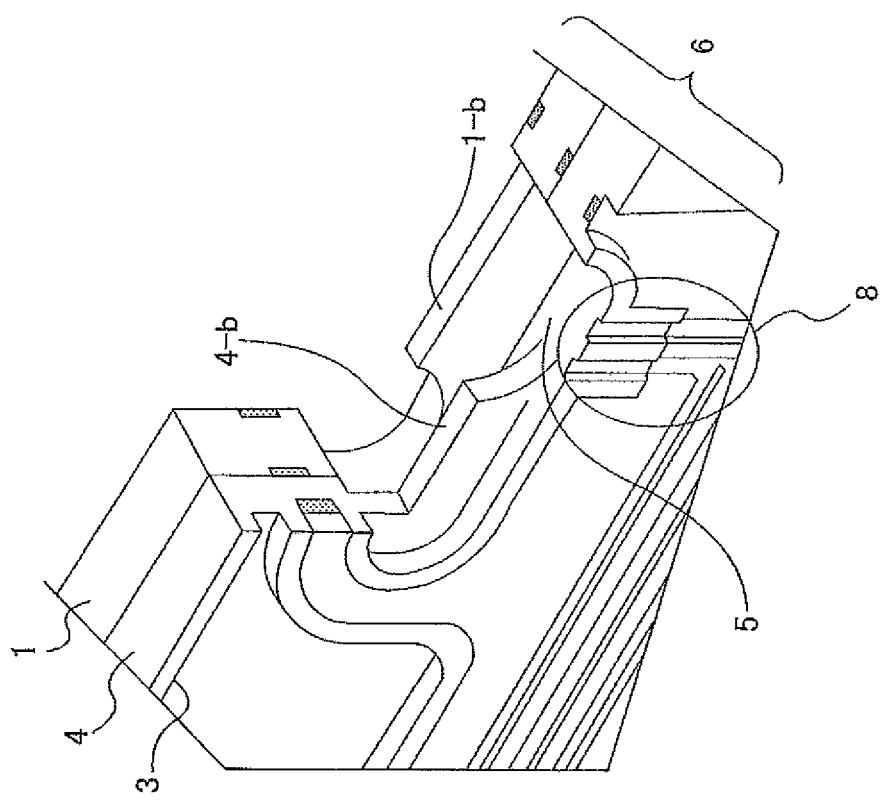
FIG. 6B is a diagram illustrating the vicinity of the cooling liquid manifold in the fuel cell of Embodiment 2.

FIGS. 6A and 6B illustrate a lamination state in the vicinity of a cooling liquid manifold 5 in a fuel cell of Embodiment 2. In FIGS. 6A and 6B, approximately ¼ of the cooling liquid manifold 5 is shown with a cross-section.

Similarly to the fuel cell of Embodiment 1, the fuel cell of Embodiment 2 includes a stacked body of fuel battery cells 6. Similarly to the fuel battery cells 6 of Embodiment 1, each of the fuel battery cells 6 of Embodiment 2 includes an MEA frame 1 that is integrated with an MEA 1-a, an anode separator 2 and a cathode separator 3 between which the MEA 1-*a* is interposed, and a sealing frame 4 for sealing the cooling liquid flow channel that comes into contact with the MEA frame 1.

The fuel battery cell 6 of Embodiment 2 includes a cooling liquid introduction channel 8 through which a cooling liquid manifold 5 and a cooling liquid flow channel 7 (a cooling liquid flow channel that is present in a power generation portion region in the separator) communicate with each other, and the cooling liquid introduction channel 8 includes a groove 8-*a* that is formed in the sealing frame 4 for sealing the cooling liquid flow channel, and a groove 8-*b* that is formed in the cathode separator 3. Here, a flow channel length L1 of the cooling liquid introduction channel that is formed in the sealing frame 4 for sealing the cooling liquid flow channel is longer than a flow channel length L2 of the cooling liquid introduction channel 8-*b* that is formed in the cathode separator 3.

A material of the sealing frame 4 for sealing the cooling liquid flow channel is an insulating material, and a material of the cathode separator 3 is a conductive material. In Embodiment 2, since a member that comes into contact with the cooling liquid is formed from an insulating member (sealing frame for sealing the cooling liquid flow channel) as much as possible, the corrosion current may be further easily suppressed.

Embodiment 3

Figure 7A:
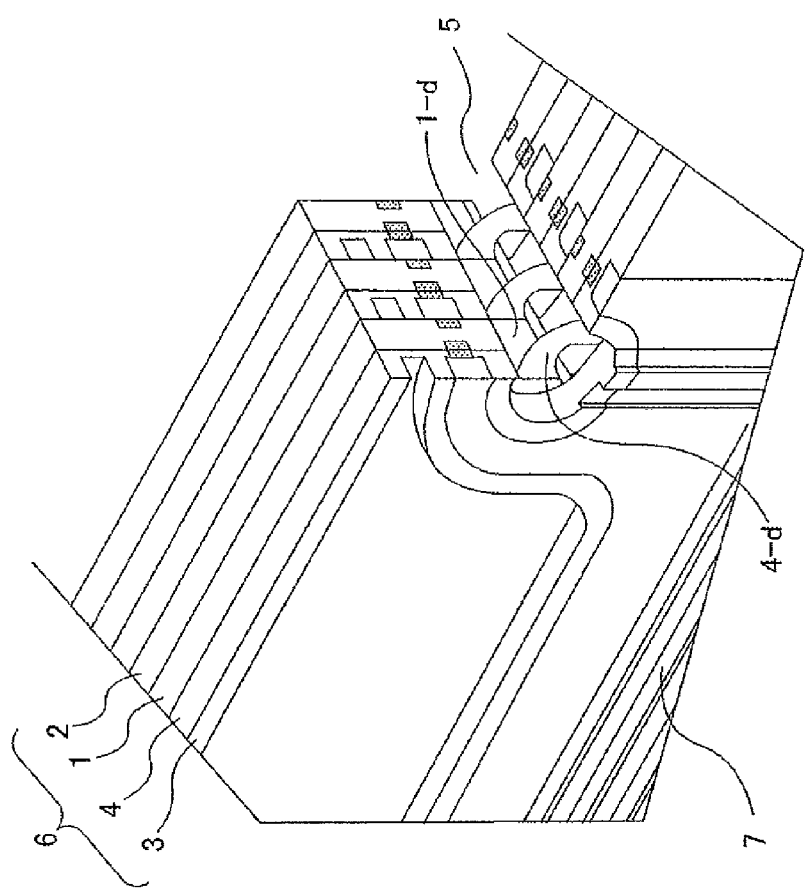
FIG. 7A is a diagram illustrating the vicinity of a cooling liquid manifold in a fuel cell of Embodiment 3.
Figure 7B:
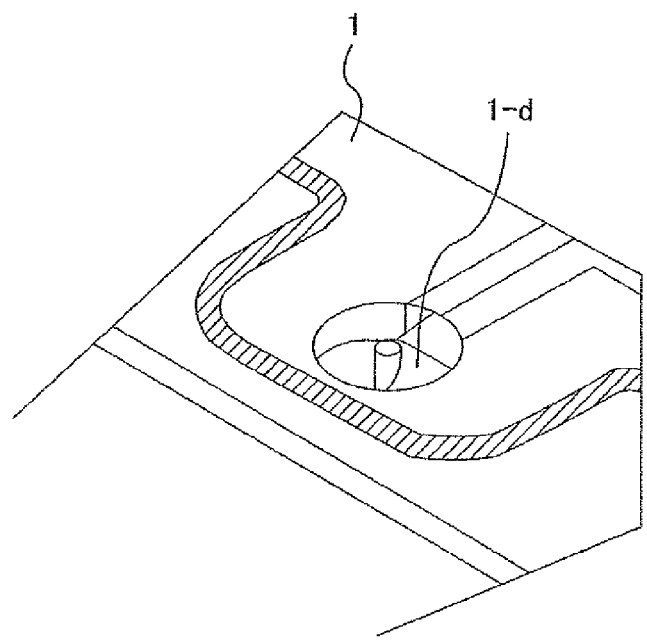
FIG. 7B is a diagram illustrating the vicinity of the cooling liquid manifold in the fuel cell of Embodiment 2.
Figure 7C:
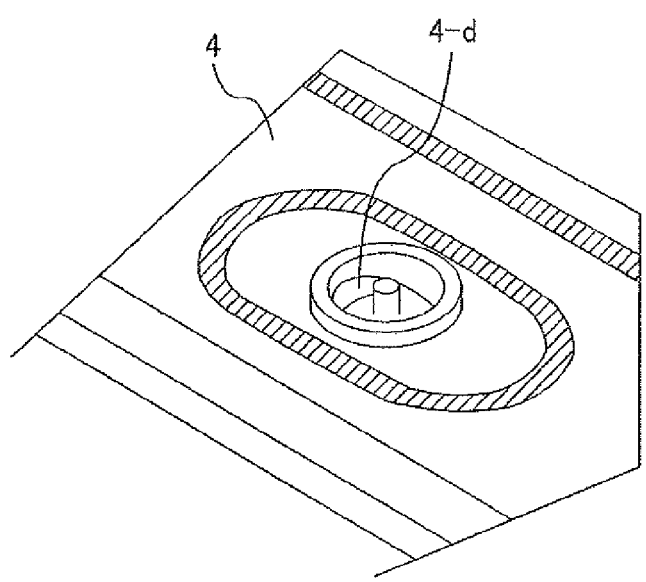
FIG. 7C is a diagram illustrating the vicinity of the cooling liquid manifold in the fuel cell of Embodiment 2.

FIGS. 7A to 7C illustrate a lamination state in the vicinity of each cooling liquid manifold 5 in a fuel cell of Embodiment 3. In FIG. 7, approximately ¼ of the cooling liquid manifold 5 is shown with a cross-section. The fuel cell of Embodiment 3 includes a stacked body of fuel battery cells 6. Similarly to the fuel battery cells 6 of Embodiment 1, each of the fuel battery cells 6 of Embodiment 3 includes a frame 1 that is integrated with an MEA 1-*a*, an anode separator 2 and a cathode separator 3 between which the MEA 1-*a* is interposed, and a sealing frame 4 for sealing the cooling liquid flow channel that comes into contact with the MEA frame 1.

Similarly to Embodiment 1, the fuel battery cell 6 of Embodiment 3 includes a cooling liquid manifold 5 that is constructed by the MEA frame 1 and the sealing frame 4 for sealing the cooling liquid flow channel. However, here, a spiral flow channel not a zigzag-shaped flow channel is constructed in the cooling liquid manifold 5. The flow channel cross-sectional area (cross-sectional area in a direction that is orthogonal to the flow direction) of the spiral flow channel is set to be constant.

So as to construct the spiral flow channel in the cooling liquid manifold 5, a curved surface-shaped protrusion 1-*d* (refer to FIG. 7B) that is provided in the MEA frame 1 and a curved surface-shaped protrusion 4-*d* (refer to FIG. 7C) that is provided in the sealing frame 4 for sealing the cooling liquid flow channel may protrude at the inside of the cooling liquid manifold 5.

Similarly to Embodiment 2, in Embodiment 3, a cooling liquid introduction channel 8 includes a groove 8-*a* that is formed in the sealing frame 4 for sealing the cooling liquid flow channel, and a groove 8-*b* that is formed in the cathode separator 3. It is preferable that the flow channel length L1 of the cooling liquid introduction channel that is formed in the sealing frame 4 for sealing the cooling liquid flow channel be longer than the flow channel length L2 of the cooling liquid introduction channel that is formed in the cathode separator 3 (not shown).

Embodiment 4

Figure 8:
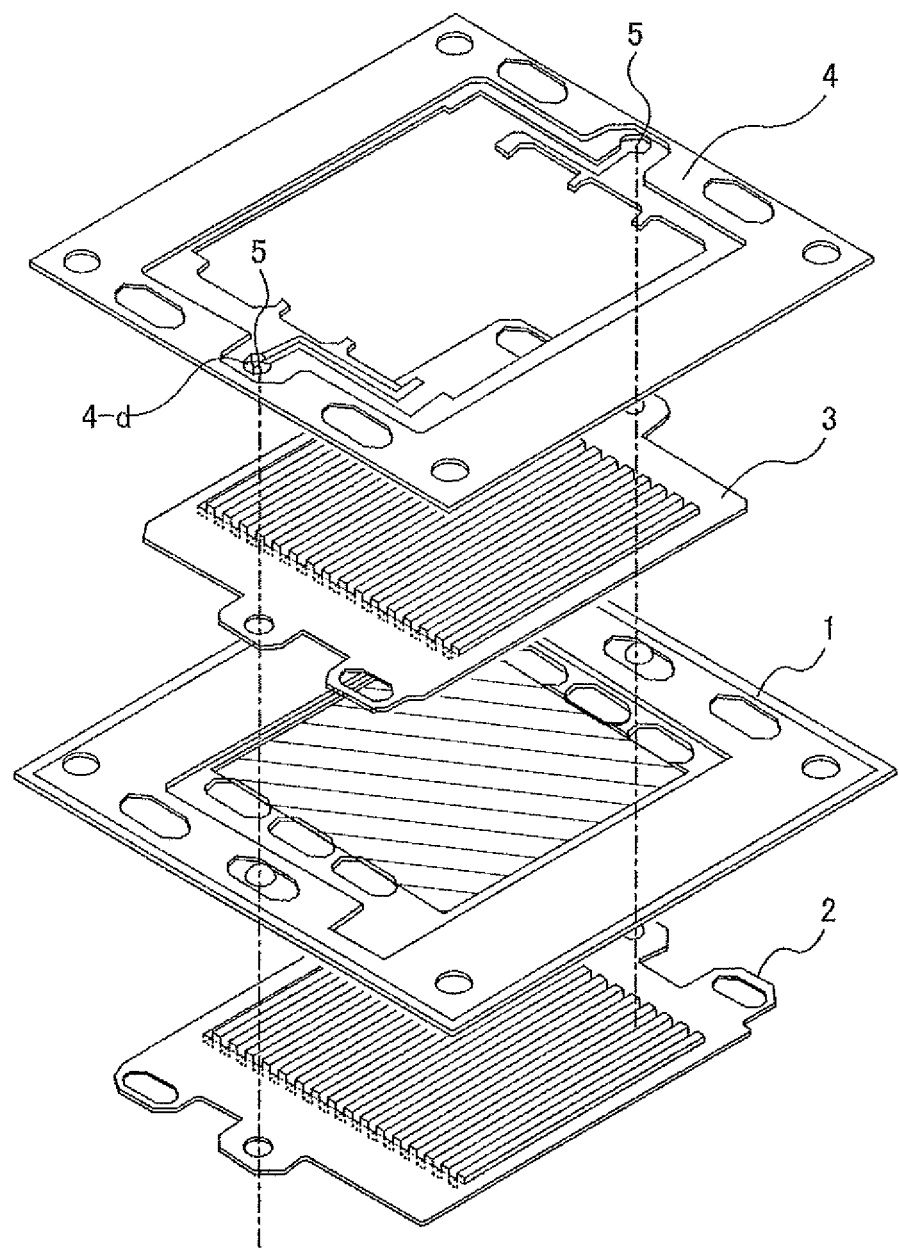
FIG. 8 is a diagram illustrating the vicinity of a cooling liquid manifold in a fuel cell of Embodiment 4.

FIG. 8 illustrates an MEA frame 1, an anode separator 2, a cathode separator 3, and a sealing frame 4 for sealing the cooling liquid flow channel of a fuel battery cell in a fuel cell of Embodiment 4. The separators 2 and 3 are metallic separators in which a flow channel is formed by press-molding a metallic plate.

Similarly to Embodiment 3, a spiral flow channel is constructed in a cooling liquid manifold 5 that is constructed in the MEA frame 1 and the sealing frame 4 for sealing the cooling liquid flow channel, and the flow channel cross-sectional area of the cooling liquid manifold 5 (cross-sectional area in a direction that is orthogonal to the flow direction of the cooling liquid) is constant.

Similarly to Embodiment 3, in the fuel cell of Embodiment 4, the flow of a current through the cooling liquid may be suppressed, and thus the drift of the cooling liquid during the output change in the fuel cell may be prevented.

Embodiment 5

Figure 9A:
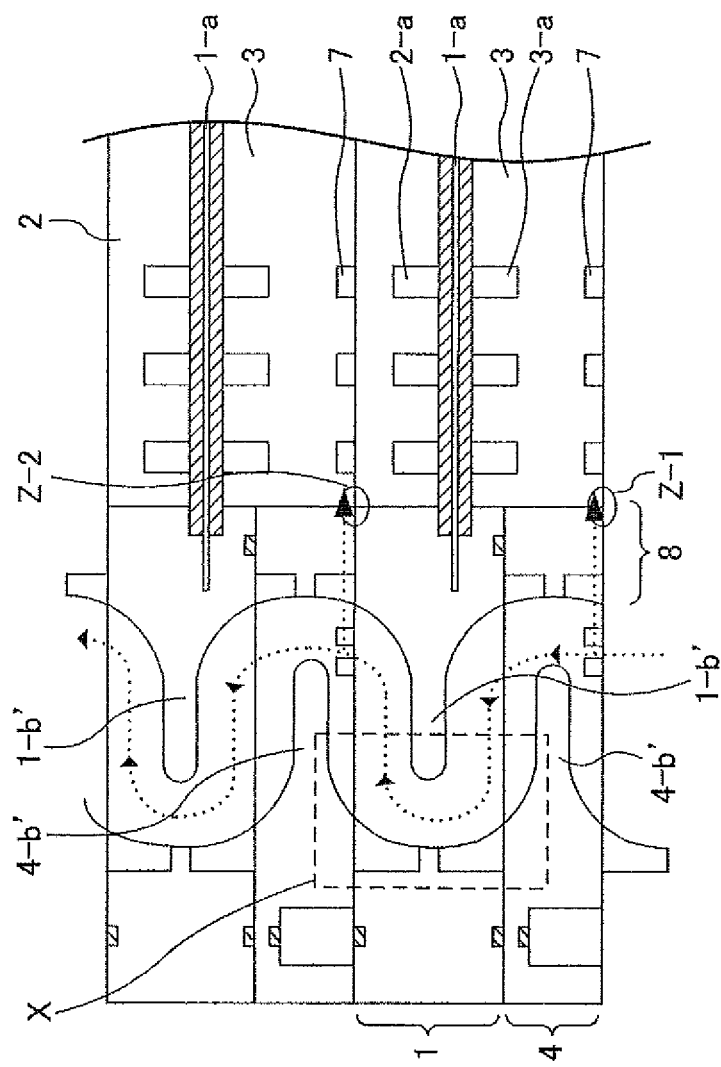
FIG. 9A is a diagram illustrating the vicinity of a cooling liquid manifold in a fuel cell of Embodiment 5.
Figure 9B:
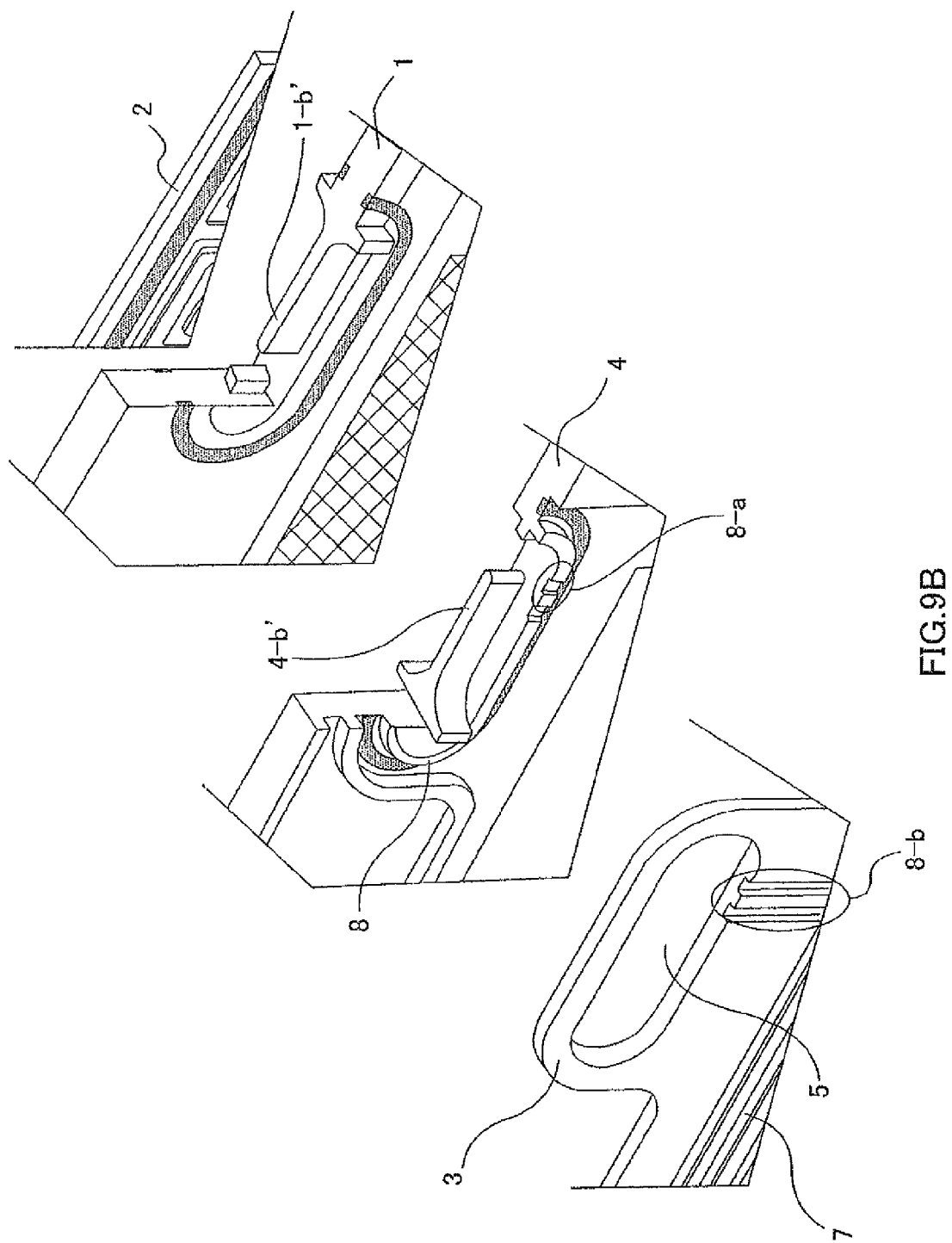
FIG. 9B is a diagram illustrating the vicinity of the cooling liquid manifold in the fuel cell of Embodiment 5.

FIGS. 9A and 9B illustrate a lamination state in the vicinity of a cooling liquid manifold 5 in a fuel cell of Embodiment 5. FIG. 9A shows a cross-section of a stacked portion, and FIG. 9B shows a perspective diagram in the vicinity of the cooling liquid manifold. In FIG. 9B, approximately ¼ of the cooling liquid manifold is shown with a cross-section.

Similarly to the fuel cell of Embodiment 1, the fuel cell of Embodiment 5 includes a stacked body of fuel battery cells 6. Similarly to the configuration as shown in FIGS. 5A and 5B, each of the fuel battery cells 6 includes an MEA frame 1 that is integrated with an MEA 1-*a*, an anode separator 2 and a cathode separator 3 between which the MEA 1-*a* is interposed, and a sealing frame 4 for sealing the cooling liquid flow channel that comes into contact with the MEA frame 1.

A cooling liquid flow channel 7 is formed in the cathode separator 3 in a surface that is opposite to a contact surface with the MEA 1-*a*. In FIGS. 5A and 5B, the cooling liquid flow channel 7 is formed in the cathode separator 3, but the cooling liquid flow channel may be formed in the anode separator 2.

The cooling liquid manifold 5 is constructed in the MEA frame 1 and the sealing frame for sealing the cooling liquid flow channel. In addition, a cooling liquid introduction channel 8, through which the cooling liquid manifold 5 and the cooling liquid flow channel 7 communicate with each other, is provided to the sealing frame 4 for sealing the cooling liquid flow channel. The cooling liquid introduction channel 8 includes a groove 8-*a* that is formed in the sealing frame 4 for sealing the cooling liquid flow channel, and a groove 8-*b* that is formed in the cathode separator 3. A part of the cooling liquid that flows through the cooling liquid manifold 5 passes through the cooling liquid introduction channel 8 and flows to the cooling liquid flow channel 7 of the cathode separator 3.

Similarly to the fuel cell of Embodiment 1 shown in FIGS. 5A and 5B, a protrusion 1-*b'* that is provided to the MEA frame 1 and a protrusion 4-*b'* that is provided to the sealing frame 4 for sealing the cooling liquid flow channel protrude at the inside of the cooling liquid manifold 5 of the fuel cell of Embodiment 5. The protrusion 1-*b'* of the MEA frame 1 and the protrusion 4-*b'* of the sealing frame for sealing the cooling liquid flow channel protrude in directions that are opposite to each other. Accordingly, the cooling liquid that flows through the cooling liquid manifold 5 flows inside the cooling liquid manifold 5 in a zigzag manner as shown by the arrow in FIG. 9A.

Furthermore, the protrusion 1-b' and the protrusion 4-b' constitute a flow channel turn portion of the cooling liquid manifold. Specifically, the flow channel turn portion is constructed by a tip portion of the protrusion 1-b' and a bottom portion of the protrusion 4-b' (refer to X in FIG. 9A), or a bottom portion of the protrusion 1-b' and a tip portion of the protrusion 4-b'.

Figure 9C:
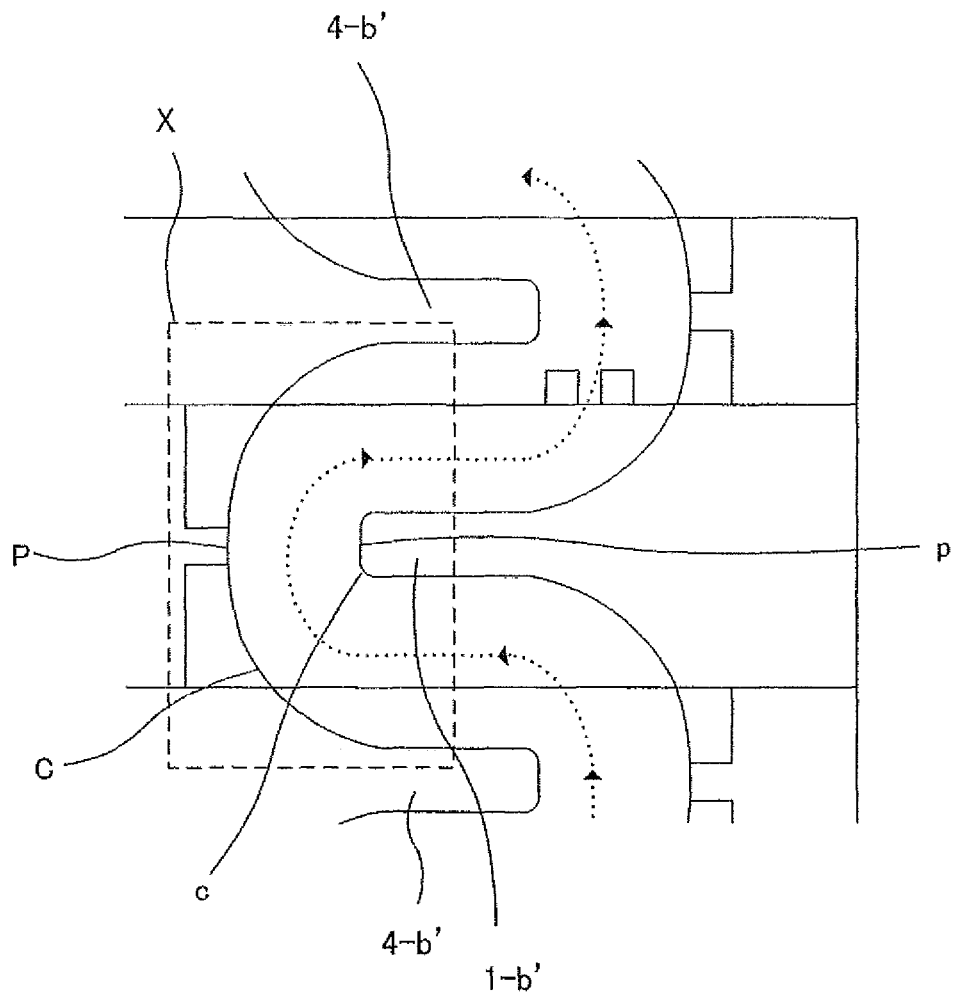
FIG. 9C is a diagram illustrating a folded-back flow channel portion (flow channel turn portion) of the cooling liquid manifold in the fuel cell of Embodiment 5.

FIG. 9C shows an enlarged diagram illustrating the vicinity of the flow channel turn portion X of FIG. 9A. As shown in FIG. 9C, it is preferable that the tip portion of the protrusion 1-b' making up the flow channel turn portion X include a flat portion p and an arc portion c, and the bottom portion of the protrusion 4-b' also include a flat portion P and an arc portion C. Similarly, it is preferable that the tip portion of the protrusion 4-b' include a flat portion and an arc portion, and the bottom portion of the protrusion 1-b' also include a flat portion and an arc portion.

It is preferable that the arc portion c of the tip portion of the protrusion 1-b' and the arc portion C of the bottom portion of the protrusion 4-b' form concentric arcs (refer to FIG. 9C). Similarly, it is preferable that the arc portion of the bottom portion of the protrusion 1-b' and the arc portion of the tip portion of the protrusion 4-b' form concentric arcs. When the shape of the protrusion 1-b' and the protrusion 4-b' is set in this manner, the cross-sectional area of the cooling liquid manifold in a direction that is orthogonal to the flow direction of the cooling liquid may be easily set to be relatively constant.

Similarly to the fuel cell of Embodiment 1, since the cooling liquid flows inside the cooling liquid manifold 5 in a zigzag manner, the length of the flow channel constructed by the cooling liquid manifold 5 along the flow of the cooling liquid in the fuel battery cell 6 becomes longer than the thickness in a lamination direction of the fuel battery cell 6.

As a result, the distance between an entrance portion Z-1 of the cooling liquid flow channel 7 of the cathode separator 3 in an arbitrary fuel battery cell, and an entrance portion Z-2 of the cooling liquid flow channel of the cathode separator 3 in a fuel battery cell that is adjacent to the entrance portion Z-1 along the flow of the cooling liquid in the cooling liquid manifold 5 becomes longer, the entrance portions Z-1 and Z-2 coming into contact with the cooling liquid introduction channel 8. Accordingly, the insulation between cathode separators 3 of adjacent fuel battery cells becomes easy to maintain.

In this manner, the flow of the current through the cooling liquid in the cooling liquid manifold 5 may be suppressed, and thus the corrosion deterioration of a constituent material of the fuel battery cell 6 may be prevented.

As described above, in the fuel cell of Embodiment 5, the shape of the protrusion 1-b and the protrusion 4-b is set so as to easily make the cross-sectional area of the cooling liquid manifold 5 constant, the cross-sectional area being in a direction orthogonal to a flow direction of the cooling liquid. When the cross-sectional area of the cooling liquid manifold 5 in a direction that is orthogonal to the flow direction of the cooling liquid is set to be constant, even when the output state of the fuel cell is changed (for example, the output state is changed from a high-output state to a low-output state) and thus the amount of the cooling liquid that is supplied to the cooling liquid manifold 5 is changed, it is difficult for the drift to occur in the cooling liquid inside the cooling liquid manifold 5.

Experimental Example 1

Figure 2A:
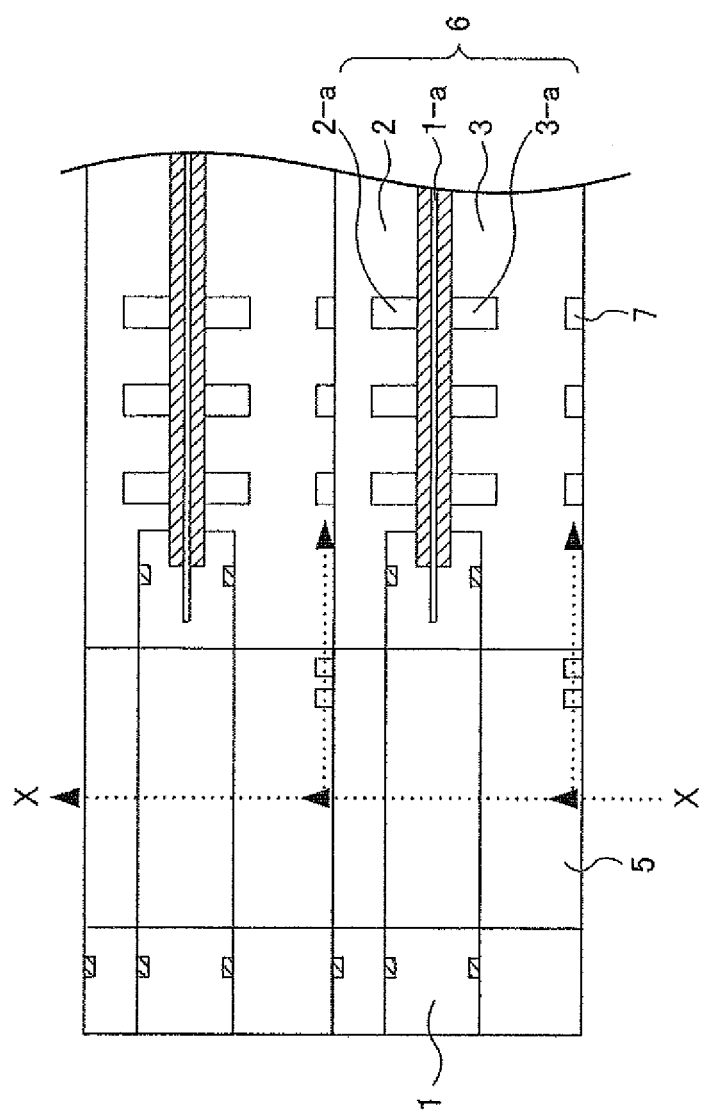
FIG. 2A is a diagram illustrating the vicinity of a cooling liquid manifold in a fuel cell in the related art.
Figure 2B:
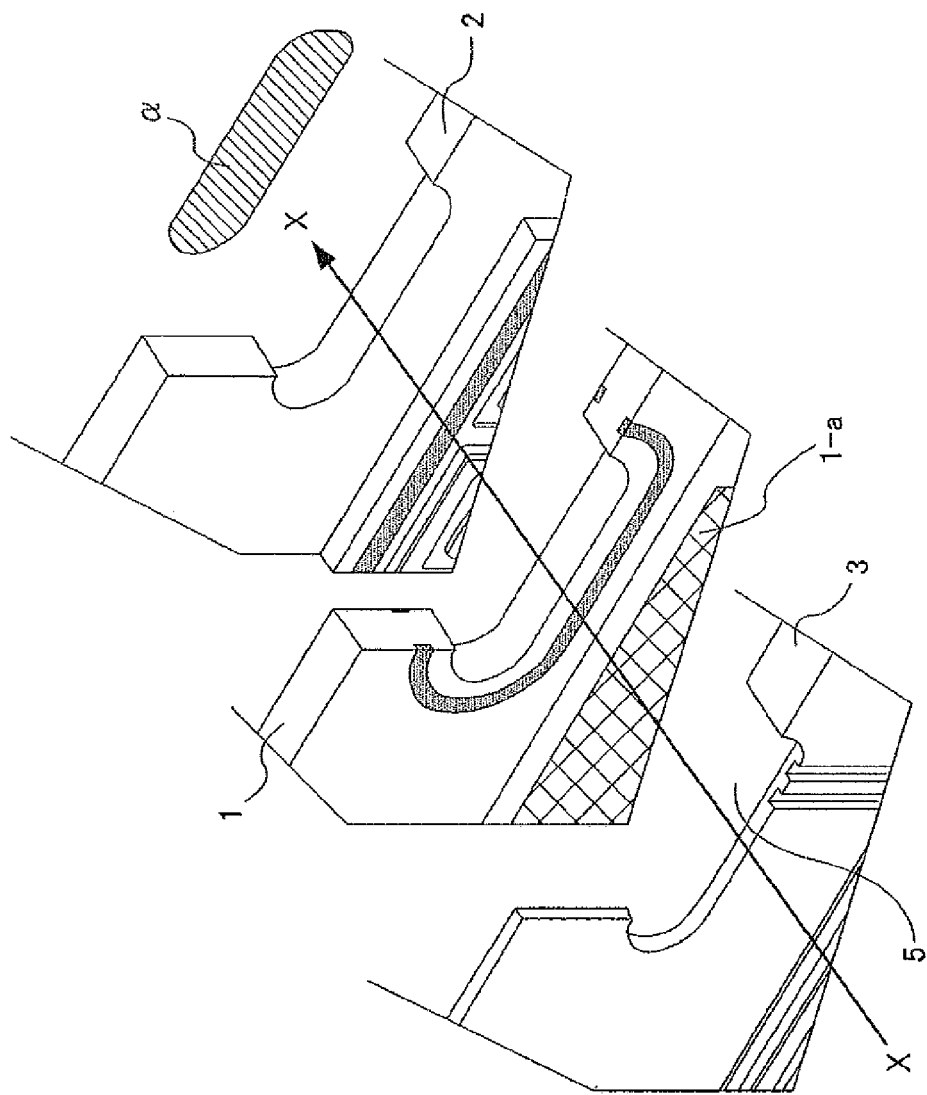
FIG. 2B is a diagram illustrating the vicinity of the cooling liquid manifold in the fuel cell in the related art.
Figure 3A:
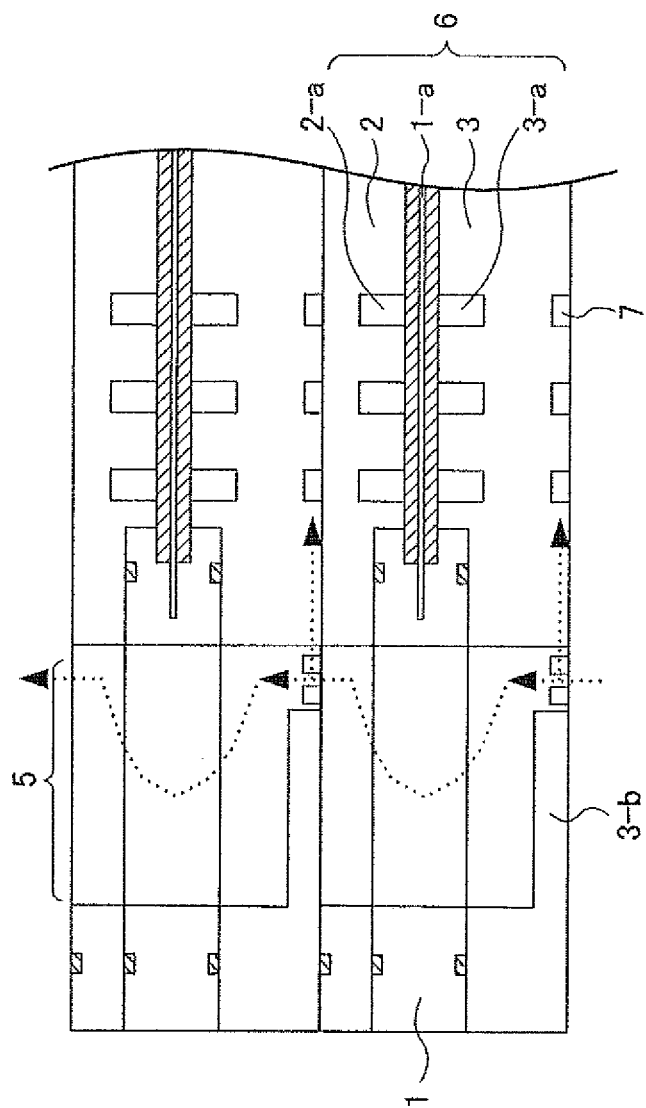
FIG. 3A is a diagram illustrating the vicinity of a cooling liquid manifold in a fuel cell of a reference example.
Figure 3B:
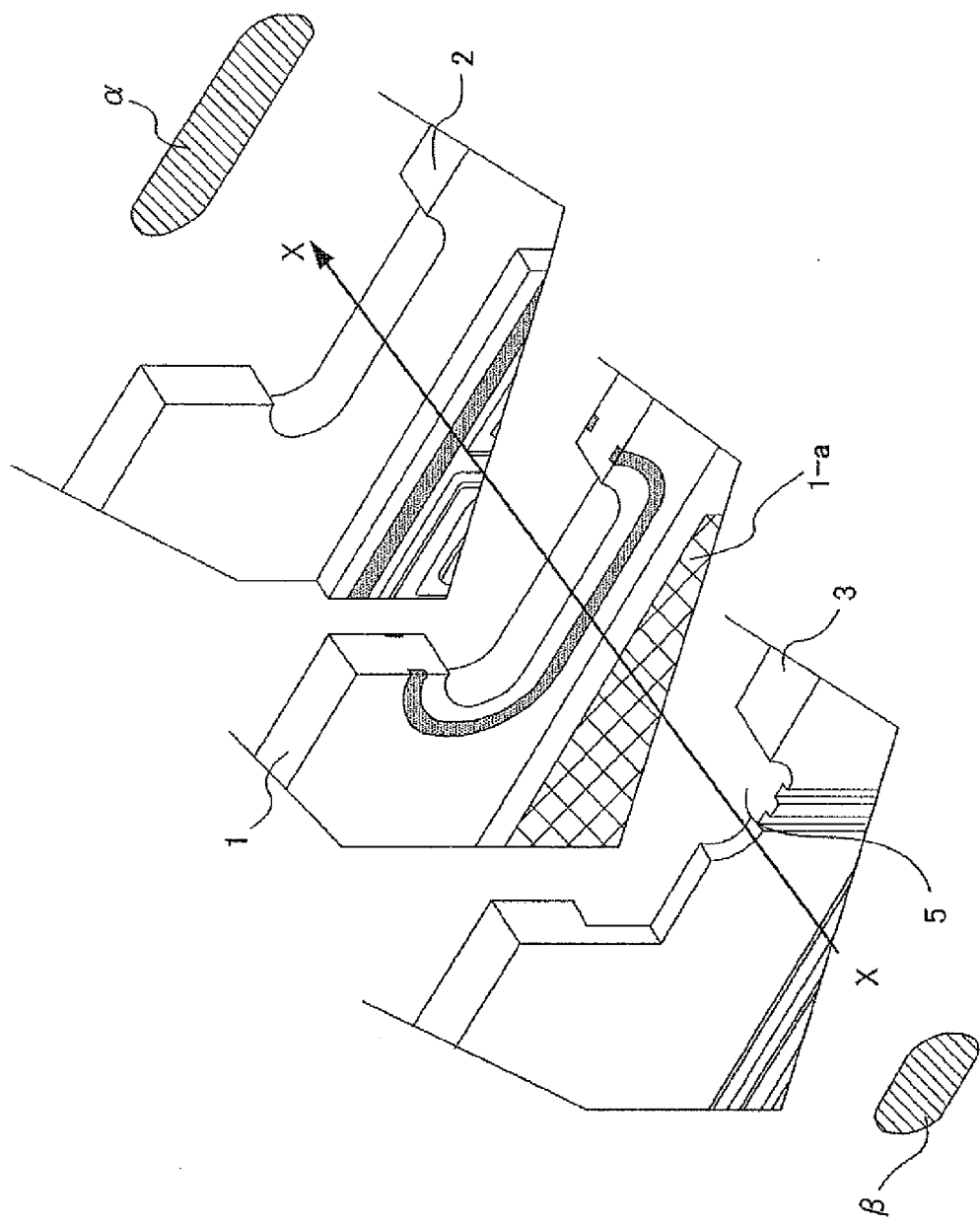
FIG. 3B is a diagram illustrating the vicinity of the cooling liquid manifold in the fuel cell of the reference example.
Figure 4:
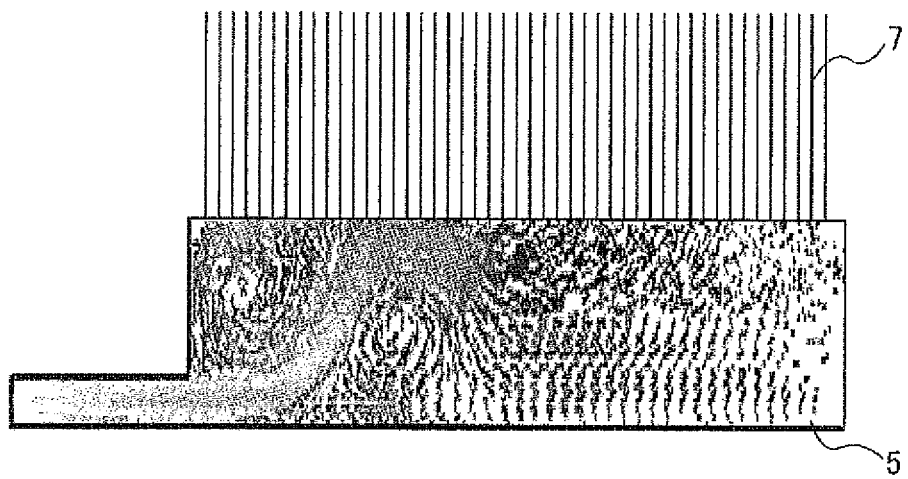
FIG. 4 is a diagram illustrating a simulation result of a cooling liquid flow in the cooling liquid manifold.

The corrosion currents were measured of the fuel cell in the related art shown in FIGS. 2A and 2B, the fuel cell of reference example shown in FIGS. 3A and 3B, the fuel cell of Embodiment 1 shown in FIGS. 5A and 5B, the fuel cell of Embodiment 2 shown in FIGS. 6A and 6B, and the fuel cell of Embodiment 3 shown in FIGS. 7A to 7C, respectively. The respective fuel cells were constructed as a fuel cell having a structure shown in FIG. 1 by laminating fuel battery cells.

Figure 10:
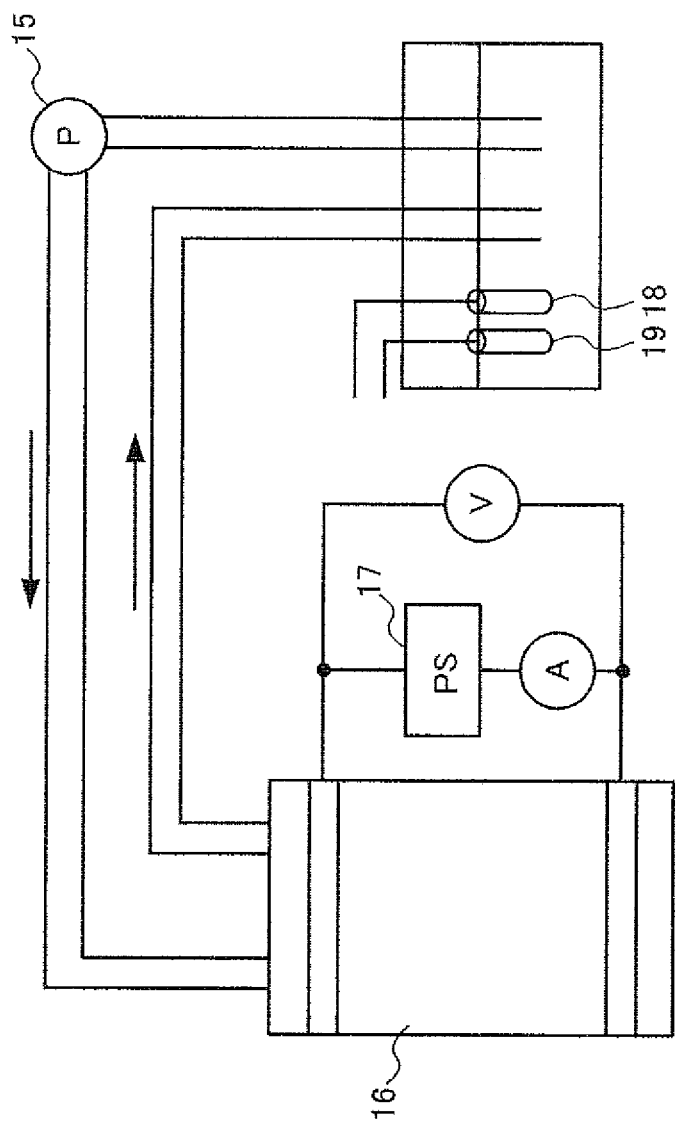
FIG. 10 is a block diagram of a device of measuring a corrosion current of a fuel cell.

FIG. 10 shows a block diagram of a device that was used to measure the corrosion current of the fuel cell. The device shown in FIG. 10 supplies a cooling liquid in a thermostatic chamber of which temperature is maintained at 80° C. by a heater 18 to a fuel cell 16 using a cooling liquid circulation pump 15. A voltage within a range of 0 to 120 V was applied to a current collector plate of a positive electrode of the fuel cell using a DC power supply 17 while supplying the cooling liquid to the fuel cell 16, And also the current was measured.

As the cooling liquid, a pure water to which a sodium sulfate was added as a conducting agent was used, Conductivity of the cooling liquid was adjusted to 200 µS/cm. During the measurement of the corrosion current, the conductivity of the cooling liquid was measured by a conductivity meter 19 provided in the thermostatic chamber, and the conductivity of the cooling liquid was maintained within a range of 200±5 µS/cm.

Figure 11:
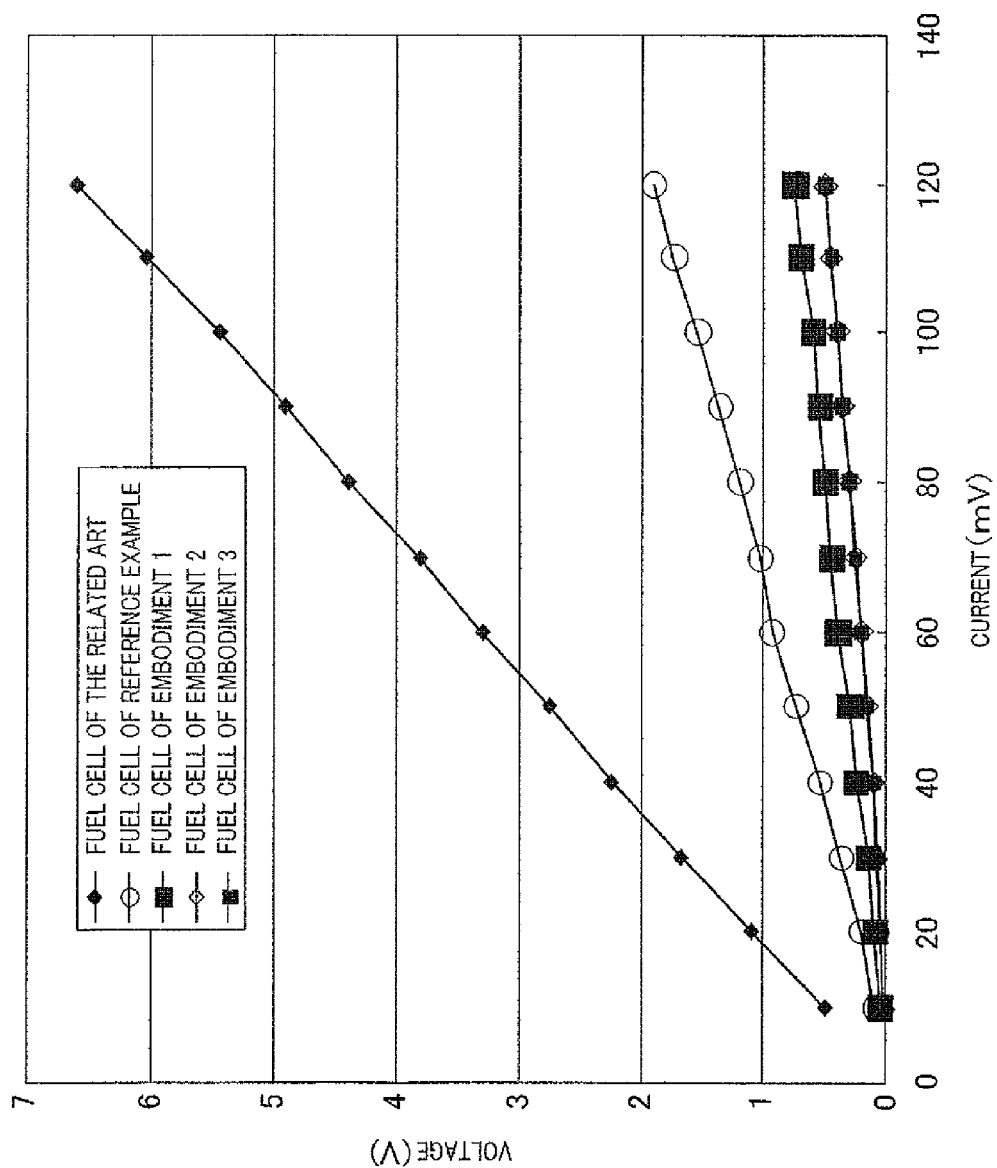
FIG. 11 is a graph obtained by plotting applied voltages and measurement results of a flowing corrosion current in each fuel cell of the example in the related art, the reference example, and Embodiments 1 to 3.

FIG. 11 shows a graph obtained by plotting applied voltages and measured current values in the respective fuel cells. In the fuel cell of the reference example, it can be seen that the current value that is measured at each voltage significantly decreases compared to the fuel cell in the related art. This is considered to be because the flow channel cross-sectional area of the cooling liquid manifold 5 partially decreases due to the protrusion 3-b and thus the flow of a current through the cooling liquid inside the cooling liquid manifold 5 is suppressed.

Next, in the fuel cells of Embodiments 1 to 3, the current value that is measured at each voltage decreases compared to the fuel cell in the reference example. This is considered to be because the flow channel constructed by the cooling liquid manifold is a zigzag-shaped flow channel or a spiral flow channel, and thus a flow channel length of the manifold that connects cathode separators to each other is elongated.

Furthermore, in the fuel cells of Embodiments 2 and 3, the current value that is measured at each voltage further decreases compared to the fuel cell of Embodiment 1. This is considered to be because the length L1 of the cooling liquid introduction portion that is formed in the insulating frame is made to be long in the fuel cells of Embodiments 2 and 3, and thus the flow channel length from one separator to another and the flow channel length from a negative electrode to a separator become long.

Experimental Example 2

Figure 12:
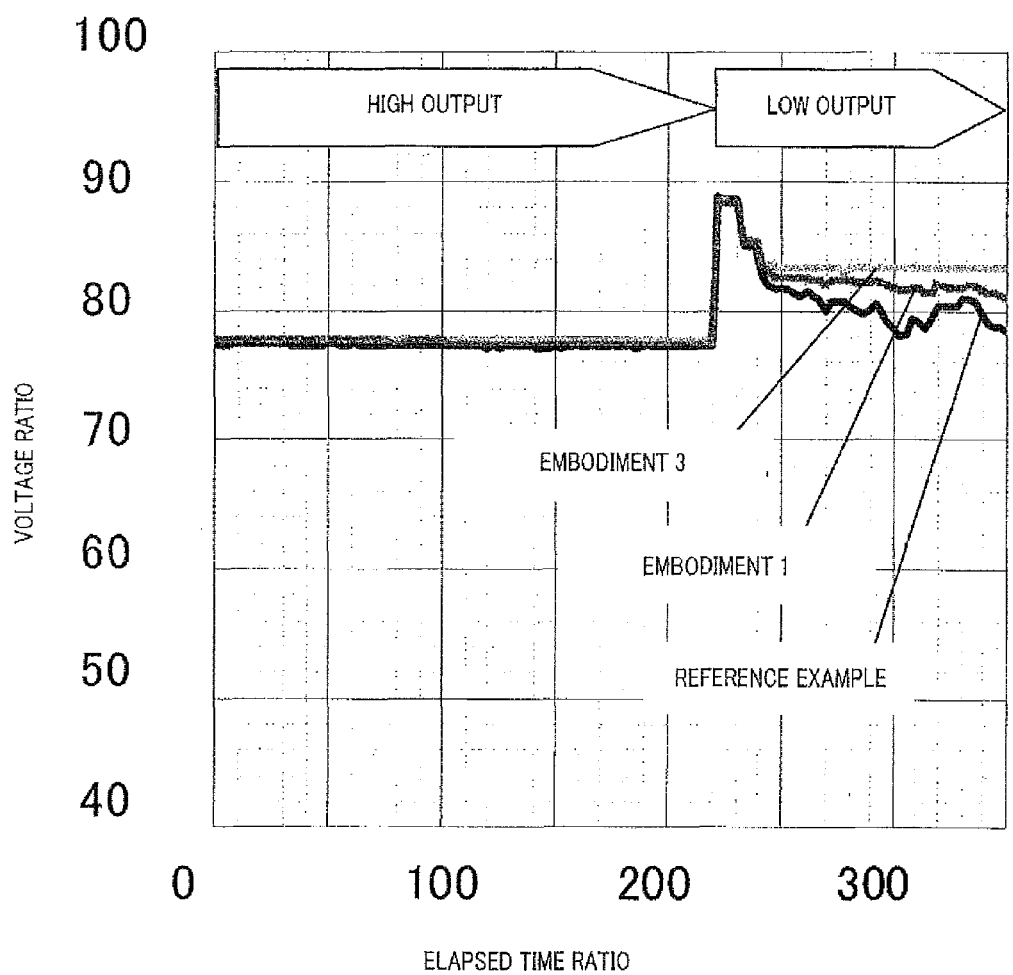
FIG. 12 is a graph obtained by plotting voltages of the fuel cell when a high-output operation is switched to a low-output operation.

A voltage variation when a high-output state operation is switched to a low-output state operation was measured of the fuel cell of the reference example shown in FIGS. 3A and 3B, the fuel cell of Embodiment 1 shown in FIGS. 5A and 5B, and the fuel cell of Embodiment 3 shown in FIGS. 7A to 7C. The measurement results are shown in FIG. 12. FIG. 12 shows a graph obtained by plotting the elapsed time and the voltage ratio.

In the fuel cell of Embodiments 1 and 3, a vibration range of the voltage ratio when the output is switched decreases compared to the fuel cell of reference example. This is considered to be because in the fuel cell of the reference example, the drift of the cooling liquid inside the cooling liquid manifold occurs. When the drift occurs, a cooling liquid, which is not sufficiently warmed in the cooling liquid manifold, flows to a cooling liquid flow channel of the separator, and thus the temperature of the separator in the vicinity of a cooling liquid entrance decreases. As a result, dew condensation water occurs in the reaction gas so as to generate a flooding.

Conversely, in the fuel cell of Embodiments 1 and 3, it is considered that the drift inside the cooling liquid manifold is suppressed. That is, since the flow channel cross-sectional area of the cooling liquid manifold of the fuel cells of Embodiments 1 and 3 is constant, it is difficult for the drift to occur inside the cooling liquid manifold, and thus a sufficiently heat-exchanged cooling liquid flows to the cooling liquid channel of the separator. As a result, it is considered difficult for the flooding to occur.

Furthermore, in the fuel cell of Embodiment 3, the vibration range after the output is switched further decreases compared to the fuel cell of Embodiment 1. This is considered to be because the cooling liquid manifold of the fuel cell of the Embodiment 3 constructs a spiral flow channel, and thus it is more difficult for the drift of the cooling liquid to occur.

INDUSTRIAL APPLICABILITY

According to the solid polymer fuel cell of the invention, even when then output is changed, the voltage is stable, and the flow of the corrosion current through the cooling liquid is suppressed, and thus corrosion deterioration of the constituent member of the fuel battery cell is suppressed. That is, the solid polymer fuel cell of the invention has a stable power generation performance even when output change is frequently performed, and thus long term durability is excellent. Therefore, the solid polymer fuel cell of the invention is applicable to fuel cells for various uses such as a portable power supply, a power supply for an electric vehicle, and an in-house cogeneration system.

REFERENCE SIGNS LIST

1 Mea frame
1-a MEA
1-b, 1-b' Protrusion of MEA frame
1-d Protrusion on curved surface of MEA frame
2 Anode separator
2-a Fuel gas flow channel
3 Cathode separator
3-a Oxidant gas flow channel
3-b Protrusion of cathode separator
4 Sealing frame
4-b, 4-b' Protrusion of sealing frame
4-d Protrusion on curved surface of sealing frame
5 Cooling liquid manifold
6 Fuel battery cell
7 Cooling liquid flow channel
8 Cooling liquid introduction channel
8-a Groove formed in sealing frame
8-b Groove formed in cathode separator
9 Current collector plate
10 Insulating plate
11 End plate with pipes
12 Bolt
13 Nut
14 Stacked body
15 Cooling liquid circulation pump
16 Fuel cell
17 DC power supply
18 Heater
19 Conductivity meter
X, X' Flow channel turn portion
Z-1, Z-2 Entrance portion of cooling liquid flow channel

The invention claimed is:

1. A solid polymer fuel cell that is formed by laminating a plurality of fuel battery cells,
wherein each of the fuel battery cells includes,
a polymer electrolyte membrane,
an anode and a cathode between which the polymer electrolyte membrane is interposed,
an anode separator that comes into contact with the anode,
a cathode separator that comes into contact with the cathode,
an insulating frame that surrounds the periphery of the polymer electrolyte membrane, the anode, and the cathode, and
a cooling liquid manifold that is formed in the insulating frame and, communicates with a cooling liquid flow channel, and is configured to allow a cooling liquid to flow,
at least one of the plurality of fuel cell battery cells includes the cooling liquid flow channel that is provided to the anode separator in a surface that is opposite to a surface that comes into contact with the anode, or to the cathode separator in a surface that is opposite to a surface that comes into contact with the cathode, and
the cooling liquid manifold has a plurality of protrusions,
a size of the plurality of protrusions is set in such a manner that a flow channel of the cooling liquid manifold has a constant flow channel cross-sectional area, and
due to the plurality of protrusions a flow channel length of the cooling liquid manifold included in one of the fuel battery cells along a flow channel direction is longer than the thickness of the one fuel battery cell in a lamination direction, wherein a horizontal direction of the cooling liquid manifold is parallel to the lamination direction.

2. The solid polymer fuel cell according to claim 1,
wherein the flow channel of the cooling liquid manifold includes a folded-back flow channel portion.

3. The solid polymer fuel cell according to claim 1,
wherein the flow channel of the cooling liquid manifold has a spiral shape.

4. The solid polymer fuel cell according to claim 1,
wherein the cooling liquid flow channel and the cooling liquid manifold communicate with each other through cooling liquid communication portions formed in the insulating frame and the separator, and
a flow channel length of the cooling liquid communication portion formed in the insulating frame is longer than a flow channel length of the cooling liquid communication portion formed in the separator.

5. The solid polymer fuel cell according to claim 1,
wherein the insulating frame includes,
an MEA frame that integrates the polymer electrode membrane and the anode and the cathode between which the polymer electrode membrane is interposed, and
a sealing frame for sealing the cooling liquid flow channel that forms at least a part of the cooling liquid communication portion that connects the cooling liquid flow channel and the cooling liquid manifold.

6. The solid polymer fuel cell according to claim 5,
wherein a first protrusion of the plurality of protrusions is provided in the MEA frame and a second protrusion of the plurality of protrusions is provided in the sealing frame, the first protrusion protrudes in a first direction that is opposite to a second direction in which the second protrusion protrudes, and the first and second directions are perpendicular to the thickness of the one fuel battery cell in the lamination direction.

* * * * *